United States Patent
Hanzawa

(10) Patent No.: US 10,536,654 B2
(45) Date of Patent: Jan. 14, 2020

(54) SIGNAL PROCESSING APPARATUS, CONTROL METHOD, IMAGE PICKUP ELEMENT, AND ELECTRONIC DEVICE

(71) Applicant: SONY CORPORATION, Tokyo (JP)

(72) Inventor: Katsuhiko Hanzawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 222 days.

(21) Appl. No.: 15/502,597

(22) PCT Filed: Aug. 14, 2015

(86) PCT No.: PCT/JP2015/072949
§ 371 (c)(1),
(2) Date: Feb. 8, 2017

(87) PCT Pub. No.: WO2016/031594
PCT Pub. Date: Mar. 3, 2016

(65) Prior Publication Data
US 2018/0213171 A1    Jul. 26, 2018

(30) Foreign Application Priority Data
Aug. 25, 2014 (JP) ................. 2014-170470

(51) Int. Cl.
*H04N 5/365* (2011.01)
*H04N 5/374* (2011.01)
*H04N 5/378* (2011.01)

(52) U.S. Cl.
CPC ........... *H04N 5/3651* (2013.01); *H04N 5/365* (2013.01); *H04N 5/374* (2013.01); *H04N 5/378* (2013.01)

(58) Field of Classification Search
CPC ...... H04N 5/3651; H04N 5/365; H04N 5/374; H04N 5/378

(Continued)

(56) References Cited

U.S. PATENT DOCUMENTS 8,179,465 B2 *    5/2012    Tanaka ................... H04N 5/365
                                                        348/294
2001/0020909 A1 *    9/2001    Sakuragi ............. H03M 1/1225
                                                        341/139

(Continued)

FOREIGN PATENT DOCUMENTS

JP    2001-346102 A    12/2001
JP    2006-319951 A    11/2006

(Continued)

OTHER PUBLICATIONS

International Search Report prepared by the Japan Patent Office dated Oct. 2, 2015, for International Application No. PCT/JP2015/072949.

*Primary Examiner* — Sinh Tran
*Assistant Examiner* — Zhenzhen Wu
(74) *Attorney, Agent, or Firm* — Sheridan Ross P.C.

(57) ABSTRACT

The present technology relates to a signal processing apparatus, a control method, an image pickup element, and an electronic device which make it possible to suppress RTS noise. The signal processing apparatus of the present technology may include an amplifying transistor and a short-circuit unit. The amplifying transistor amplifies a signal input to a gate, and the short-circuit unit is capable of short-circuiting the gate of the amplifying transistor to a potential which reduces a gate-to-source voltage of the amplifying transistor. For example, it is determined whether the amplifying transistor is in a period of a non-operating state, and when the amplifying transistor is determined to be in the period of a non-operating state, the gate of the amplifying transistor may be short-circuited. The present technology can be applied, for example, to an image pickup element and an electronic device.

18 Claims, 19 Drawing Sheets

(58) Field of Classification Search
USPC .......................................................... 348/300
See application file for complete search history.

(56) References Cited

U.S. PATENT DOCUMENTS

| | | | | |
|---|---|---|---|---|
| 2006/0232580 | A1* | 10/2006 | Koyama | H04N 5/3591 345/211 |
| 2008/0055432 | A1* | 3/2008 | Koseki | H04N 5/3658 348/241 |
| 2011/0204977 | A1* | 8/2011 | Kato | H04N 5/378 330/252 |
| 2013/0256512 | A1* | 10/2013 | Shioya | H04N 5/3355 250/208.1 |
| 2013/0341489 | A1* | 12/2013 | Yoshida | H04N 5/3355 250/208.1 |
| 2014/0291482 | A1* | 10/2014 | Tanaka | H04N 5/378 250/208.1 |

FOREIGN PATENT DOCUMENTS

| | | |
|---|---|---|
| JP | 2008-54256 A | 3/2008 |
| JP | 2008-060872 | 3/2008 |
| JP | 2011-176616 A | 9/2011 |
| JP | 2013-207433 A | 10/2013 |
| JP | 2014-7527 A | 1/2014 |

\* cited by examiner

SIGNAL PROCESSING APPARATUS, CONTROL METHOD, IMAGE PICKUP ELEMENT, AND ELECTRONIC DEVICE

CROSS REFERENCE TO RELATED APPLICATIONS

This application is a national stage application under 35 U.S.C. 371 and claims the benefit of PCT Application No. PCT/JP2015/072949 having an international filing date of 14 Aug. 2015, which designated the United States, which PCT application claimed the benefit of Japanese Patent Application No. 2014-170470 filed 25 Aug. 2014, the disclosures of which are incorporated herein by reference in their entirety.

TECHNICAL FIELD

The present technology relates to a signal processing apparatus, a control method, an image pickup element, and an electronic device, and particularly relates to a signal processing apparatus, a control method, an image pickup element, and an electronic device, which make it possible to suppress RTS noise.

BACKGROUND ART

Conventionally, noise countermeasures have been taken against random telegraph signal (RTS) noise occurring in transistors, in image sensors and the like. For example, a method is considered in which an input transistor in a differential stage is increased in size in an A/D converter. However, there is a risk of occurrence of another noise such as aggravated noise resulting from a kickback or simultaneous inversion of comparator output. Also, a method is considered which uses, for example, a built-in transistor. However, there is a need to modify a process, and is a risk of increasing cost.

Also, in a case of an image sensor, RTS noise is noticeable as a vertical streak in a picked-up image obtained with the image sensor, and therefore, a method is considered in which noise is injected on purpose to relatively reduce an effect of the RTS noise (for example, see Patent Document 1).

CITATION LIST

Patent Document

Patent Document 1: Japanese Patent Application Laid-Open No. 2008-60872

SUMMARY OF THE INVENTION

Problems to be Solved by the Invention

However, this method does not reduce the RTS noise, as a matter of course. Moreover, an absolute value of the noise is increased conversely, and therefore, there is a risk of decreasing quality of the picked-up image.

The present technology is proposed in view of the above circumstances, and an object of the present technology is to make it possible to suppress RTS noise occurring in a MOS transistor.

Solutions to Problems

An aspect of the present technology is a signal processing apparatus which includes an amplifying transistor and a short-circuit unit. The amplifying transistor amplifies a signal input to a gate, and the short-circuit unit is capable of short-circuiting the gate of the amplifying transistor to a potential which reduces a gate-to-source voltage of the amplifying transistor.

The amplifying transistor can be a negative metal oxide semiconductor (NMOS).

The short-circuit unit can be prepared to be capable of short circuiting the gate of the amplifying transistor to a ground potential.

The amplifying transistor can be a positive metal oxide semiconductor (PMOS).

The short-circuit unit can be prepared to be capable of short circuiting the gate of the amplifying transistor to a power supply potential.

The amplifying transistor can be an input transistor of a comparison unit which compares signal levels of two signals input thereto and outputs a comparison result.

An auto-zero unit is further included which is capable of performing auto-zeroing by short-circuiting the gate and a drain of the amplifying transistor to short-circuit an input side and an output side of the comparison unit. The short-circuit unit can short-circuit the drain of the amplifying transistor, in which the gate and the drain have been short-circuited by the auto-zero unit, to the potential which reduces the gate-to-source voltage of the amplifying transistor.

A cutting unit can be further included which cuts off the short-circuit unit from the output side of the comparison unit when the gate of the amplifying transistor is short-circuited by the short-circuit unit to the potential which reduces the gate-to-source voltage of the amplifying transistor.

A counter is further included which performs counting until the comparison result output from the comparison unit is changed. The comparison unit compares signal levels of an input analog signal and a predetermined reference signal, and outputs a comparison result thereof to the counter. The counter can perform counting until the comparison result is changed, and output a count value thereof as digital data obtained by A/D converting the input analog signal.

The comparison unit compares signal levels of a signal read from a unit pixel formed in a pixel region, and the reference signal. The counter can output a count value obtained until the comparison result output from the comparison unit is changed as digital data obtained by A/D converting the signal.

The comparison unit can compare signal levels of a signal read from a unit pixel in a row corresponding thereto in a pixel region in which the unit pixels are arranged in a matrix, and the reference signal.

The short-circuit unit can short-circuit the gate of the amplifying transistor to the potential which reduces the gate-to-source voltage of the amplifying transistor in a period of a non-operating state of the comparison unit.

The period can be a horizontal blanking period in a reading process of the signal.

The period can be a vertical blanking period in a reading process of the signal.

The amplifying transistor is an amplifying transistor which is formed in each unit pixel in the pixel region, amplifies and outputs potential changes in a floating diffusion as an analog signal. The short-circuit unit can short-circuit the floating diffusion to the potential which reduces the gate-to-source voltage of the amplifying transistor.

A control unit which controls the short-circuit unit is further included. The control unit can cause the short-circuit unit to short-circuit the gate of the amplifying transistor to the potential which reduces the gate-to-source voltage of the amplifying transistor in a period of a non-operating state of the amplifying transistor.

The control unit determines whether the amplifying transistor is in a period of a non-operating state, and when the amplifying transistor is determined to be in the period of a non-operating state, the control unit causes the short-circuit unit to short-circuit the gate of the amplifying transistor to the potential which reduces the gate-to-source voltage of the amplifying transistor. The control unit determines whether the period of a non-operating state ends, and when it is determined that the period of a non-operating state ends, the control unit can cause the short-circuit unit to cut off the gate of the amplifying transistor from the potential which reduces the gate-to-source voltage of the amplifying transistor.

An aspect of the present technology is also a signal processing method which includes: determining whether an amplifying transistor which amplifies a signal input to a gate is in a period of a non-operating state; when the amplifying transistor is determined to be in the period of a non-operating state, short-circuiting the gate of the amplifying transistor to a potential which reduces a gate-to-source voltage of the amplifying transistor; determining whether the period of a non-operating state ends; when it is determined that the period of a non-operating state ends, cutting off the gate of the amplifying transistor from the potential which reduces the gate-to-source voltage of the amplifying transistor.

Another aspect of the present technology is an image pickup element which includes: a pixel array in which a plurality of unit pixels is arranged in a matrix; a comparison unit which compares signal levels of a signal read from the unit pixel in the pixel array and a predetermined reference signal; and a counter which performs counting until a comparison result of the signal levels of the signal and the reference signal which is obtained by the comparison unit is changed, and outputs a count value thereof as digital data obtained by A/D converting the signal, in which the comparison unit includes an amplifying transistor which inputs a signal read from the unit pixel to a gate thereof and which amplifies the signal, and a short-circuit unit capable of short-circuiting the gate of the amplifying transistor to a potential which reduces a gate-to-source voltage of the amplifying transistor.

Still another aspect of the present technology is an electronic device which includes an image pickup unit which picks up an image of an object, and an image processing unit which image-processes image data obtained by image pickup by the image pickup unit, in which the image pickup unit includes: a pixel array in which a plurality of unit pixels is arranged in a matrix; a comparison unit which compares signal levels of a signal read from the unit pixel in the pixel array and a predetermined reference signal; and a counter which performs counting until a comparison result of the signal levels of the signal and the reference signal which is obtained by the comparison unit is changed, and outputs a count value thereof as digital data obtained by A/D converting the signal, and the comparison unit includes: an amplifying transistor which inputs a signal read from the unit pixel to a gate thereof and which amplifies the signal; and a short-circuit unit capable of short-circuiting the gate of the amplifying transistor to a potential which reduces a gate-to-source voltage of the amplifying transistor.

In an aspect of the present technology, it is determined whether an amplifying transistor, which amplifies a signal input to a gate, is in a period of a non-operating state, and when the amplifying transistor is determined to be in the period of a non-operating state, the gate of the amplifying transistor is short-circuited to a potential which reduces a gate-to-source voltage of the amplifying transistor, as well as it is determined whether the period of a non-operating state ends, and when it is determined that the period of a non-operating state ends, the gate of the amplifying transistor is cut off from the potential which reduces the gate-to-source voltage of the amplifying transistor.

In another aspect of the present technology, in a comparison unit in an image pickup element, which comparison unit comparing signal levels of a signal read from a unit pixel in a pixel array in which a plurality of unit pixels is arranged in a matrix and a predetermined reference signal, in a period of a non-operating state of an amplifying transistor which amplifies the signal input to a gate and compared to the reference signal, the gate of the amplifying transistor is short-circuited to a potential which reduces a gate-to-source voltage of the amplifying transistor.

In still another aspect of the present technology, in a comparison unit in an electronic device, which comparison unit comparing signal levels of a signal read from a unit pixel in a pixel array in an image pickup element which includes the pixel array in which a plurality of unit pixels is arranged in a matrix and a predetermined reference signal, in a period of a non-operating state of an amplifying transistor which amplifies the signal input to a gate and compared to the reference signal, the gate of the amplifying transistor is short-circuited to a potential which reduces a gate-to-source voltage of the amplifying transistor.

Effects of the Invention

According to the present technology, it is possible to process a signal. Also, according to the present technology, it is possible to suppress RTS noise.

MODES FOR CARRYING OUT THE INVENTION

Hereinafter, modes for carrying out the present disclosure (hereinafter referred to as embodiments) will be described. It should be noted that the description will be given in the following order.
1. First embodiment (image sensor, comparison unit)
2. Second embodiment (image sensor, unit pixel)
3. Third embodiment (another configuration example of image sensor)
4. Fourth embodiment (image pickup apparatus)

1. First Embodiment

<RTS Noise>

For analog circuits used for image sensors and the like, in particular, A/D converters, there have been conventionally made various attempts to reduce noise. For example, a comparator (also referred to as a comparison unit) is used for a common A/D converter.

Figure 1:
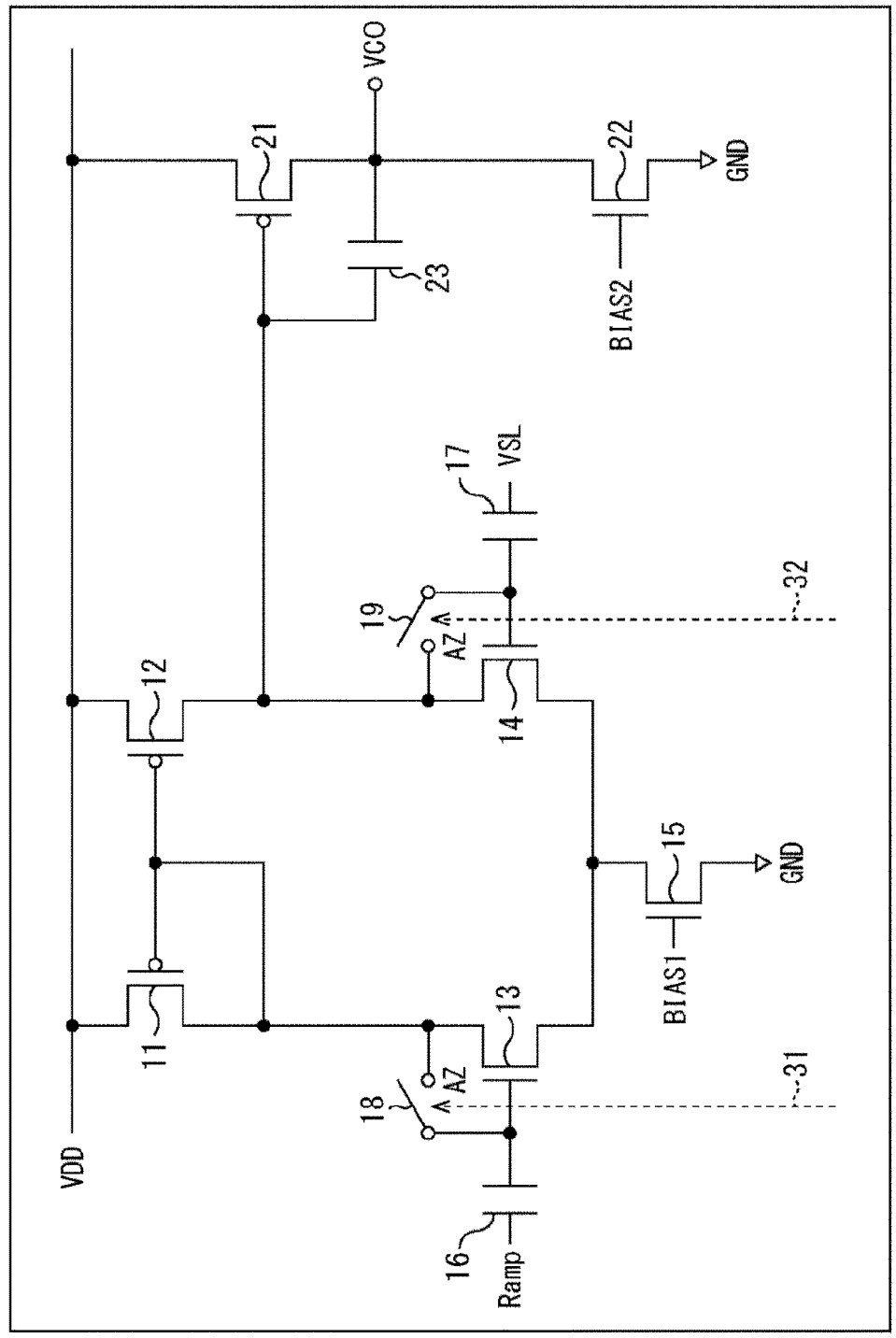
FIG. 1 is a diagram illustrating a main configuration example of a comparison unit.

FIG. 1 illustrates a main configuration example of a common comparison unit. As illustrated in FIG. 1, the common comparison unit includes a differential stage and an amplifier stage. The comparison unit includes, as the differential stage, transistors 11 to 15, capacitors 16 and 17 as an input capacitance, and switches 18 and 19 which perform an auto-zero process by short-circuiting an input side and an output side of the comparison unit. The switches 18 and 19 are supplied with a control signal from a control unit (not illustrated) through control lines 31 and 32, respectively, and are driven (perform an ON/OFF operation) on the basis of the control signal. Also, the comparison unit includes, as the amplifier stage, transistors 21 and 22, and a capacitor 23 as an output capacitance.

As described above, a common comparison unit includes a transistor, and noise reduction is attempted in a differential portion in the comparison unit.

Various kinds of noise occur in the differential portion. For example, thermal noise and 1/f noise can be relatively easily reduced by a band-limiting capacitance or the like, and correlated double sampling (CDS), respectively.

However, no countermeasures, which provide a sufficient effect, have been taken against random telegraph signal (RTS) noise occurring in transistors. For example, a method is considered in which an input transistor in a differential stage is increased in size in an A/D converter. However, there is a risk of occurrence of another noise such as aggravated noise resulting from a kickback or simultaneous inversion of comparator output. Also, a method is considered which uses, for example, a built-in transistor. However, there is a need to modify a process, and is a risk of increasing cost.

In a case of an image sensor, RTS noise appears as a vertical streak in a picked-up image obtained with the image sensor, and is noticeable. Therefore, in Patent Document 1, a method is proposed in which noise is injected on purpose to make a vertical streak less noticeable and to relatively reduce an effect of RTS noise.

However, this method does not reduce the RTS noise. Conversely, an absolute value of the noise is increased, and therefore, there is a risk of decreasing quality of the picked-up image.

Therefore, in order to suppress RTS noise occurring in transistors, a signal processing apparatus is provided with an amplifying transistor and a short-circuit unit. The amplifying transistor amplifies a signal input to a gate, and the short-circuit unit is capable of short-circuiting the gate of the amplifying transistor to a potential which reduces a gate-to-source voltage of the amplifying transistor.

For example, in a period of a non-operating state of the amplifying transistor which amplifies the signal input to the gate, the gate of the amplifying transistor is short-circuited to the potential which reduces the gate-to-source voltage of the amplifying transistor. For example, it is determined whether the amplifying transistor is in the period of a non-operating state, and when the amplifying transistor is determined to be in the period of a non-operating state, the gate of the amplifying transistor is short-circuited to the potential which reduces the gate-to-source voltage of the amplifying transistor. Also, for example, it is determined whether the period of a non-operating state of the amplifying transistor ends, and when it is determined that the period of a non-operating state ends, the gate of the amplifying transistor is cut off from the potential which reduces the gate-to-source voltage of the amplifying transistor.

By doing so, the signal processing apparatus can suppress the RTS noise occurring in the amplifying transistor.

<Image Sensor>

Figure 2:
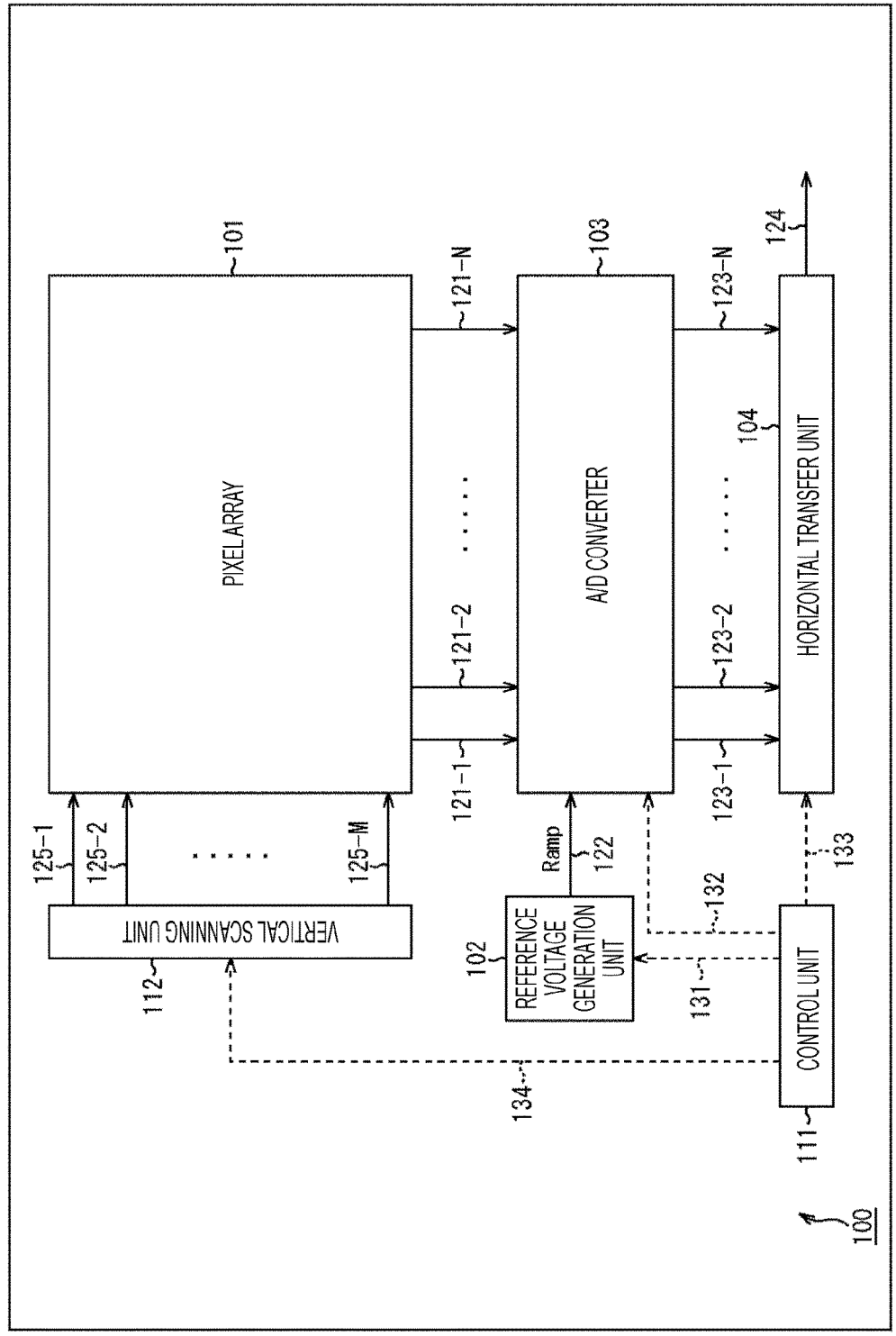
FIG. 2 is a diagram illustrating a main configuration example of an image sensor.

A main configuration example of an image sensor, which is an embodiment of an image pickup element to which the present technology is applied, is illustrated in FIG. 2. The image sensor 100 illustrated in FIG. 2 is a device with which light from an object is photoelectrically converted and output as image data. For example, the image sensor 100 is configured to be a complementary metal oxide semiconductor (CMOS) image sensor using a CMOS, a charge coupled device (CCD) image sensor using a CCD, or the like.

As illustrated in FIG. 2, the image sensor 100 includes a pixel array 101, a reference voltage generation unit 102, an A/D converter 103, a horizontal transfer unit 104, a control unit 111, and a vertical scanning unit 112.

The pixel array 101 is a pixel region where a pixel configuration (unit pixel) including a photoelectric conversion element such as a photodiode is arranged in a shape of a flat or curved plane. A configuration of the pixel array 101 will be described later in detail. An analog signal read from the unit pixel is transmitted to the A/D converter 103 through any one of vertical signal lines 121-1 to 121-N. Hereinafter, the vertical signal lines 121-1 to 121-N are referred to as a vertical signal line 121 when there is no need to discriminate the vertical signal lines 121-1 to 121-N from one another for explanation thereof.

The reference voltage generation unit 102 generates a reference signal (also referred to as a reference voltage) which serves as a standard signal of A/D conversion by the A/D converter 103. The waveform of the reference signal is arbitrary. For example, the reference signal may be a ramp wave (sawtooth wave). Hereinafter, a description will be given using an example in which a ramp wave (Ramp) is used as the reference signal. The reference voltage generation unit 102 includes, for example, a D/A converter, and generates a reference signal (Ramp) by the D/A converter.

The reference signal (Ramp) is supplied to the A/D converter 103 through a reference signal line 122.

The A/D converter 103 performs, with the reference signal, A/D conversion of an analog signal or the like transmitted from the pixel array 101 through the vertical signal line 121 (read from each unit pixel), and outputs digital data thereof to the horizontal transfer unit 104 through any one of signal lines 123-1 to 123-N. Hereinafter, the signal lines 123-1 to 123-N are referred to as a signal line 123 when there is no need to discriminate the signal lines 123-1 to 123-N from one another for explanation thereof.

The horizontal transfer unit 104 transfers the digital data supplied from the A/D converter 103 through the signal line 123 to outside of the image sensor 100 or the like through a signal line 124.

The control unit 111 controls the reference voltage generation unit 102 by supplying a control signal through a control line 131. Also, the control unit 111 controls the A/D converter 103 by supplying a control signal through a control line 132. Also, the control unit 111 controls the horizontal transfer unit 104 by supplying a control signal through a control line 133. Also, the control unit 111 controls the vertical scanning unit 112 by supplying a control signal through a control line 134. As described above, the control unit 111 controls each unit of the image sensor 100, thereby controlling operations of the image sensor 100 as a whole (operations of each unit).

It should be noted that although each of the above-described control lines 131 to 134 is indicated by one dotted line (dotted arrow) in FIG. 2, any of these control lines may be configured by a plurality of control lines.

The vertical scanning unit 112 is controlled by the control unit 111 to supply the control signal through control lines 125-1 to 125-M, thereby controlling an operation of a transistor in each unit pixel in the pixel array 101. It should be noted that hereinafter, the control lines 125-1 to 125-M are referred to as a control line 125 when there is no need to discriminate the control lines 125-1 to 125-M from one another for explanation thereof.

<Pixel Array>

Figure 3:
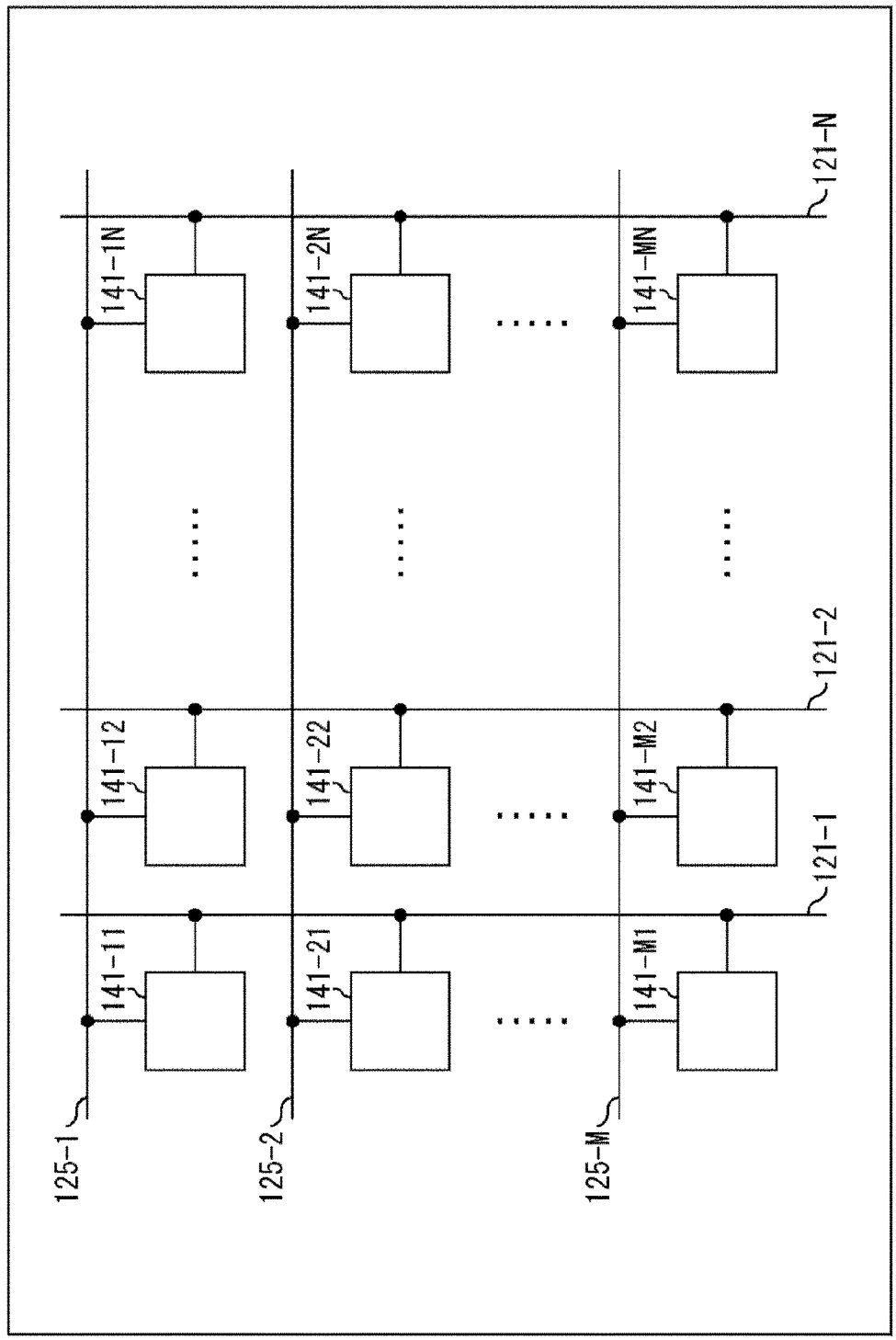
FIG. 3 is a diagram illustrating a main configuration example of a pixel array.

A main configuration example of the pixel array 101 is illustrated in FIG. 3. As described above, in the pixel region (pixel array 101), multiple unit pixels are arranged to be aligned in a planar manner. In the case of the example in FIG. 3, M×N unit pixels 141 (unit pixels 141-11 to 141-MN) are arranged to be aligned in a matrix (array) of M rows and N columns (M and N are arbitrary natural numbers). Hereinafter, the unit pixels 141-11 to 141-MN are referred to as a unit pixel 141 when there is no need to discriminate the unit pixels 141-11 to 141-MN from one another for explanation thereof. The unit pixel 141 is arbitrarily aligned, and for example, may be aligned in a manner other than a matrix such as a so-called honeycomb structure.

As illustrated in FIG. 3, the vertical signal line 121 (vertical signal lines 121-1 to 121-N) is formed for each column of the unit pixel 141 (hereinafter, also referred to as a unit pixel column). In addition, each of the vertical signal lines 121 is connected to each of the unit pixels in a column (unit pixel column) corresponding thereto, and transmits a signal read from each of the unit pixels described above to the A/D converter 103. Also, as illustrated in FIG. 3, the control line 125 (control lines 125-1 to 125-M) is formed for each row of the unit pixel 141 (hereinafter, also referred to as a unit pixel row). In addition, each of the control lines 125 is connected to each of the unit pixels in a unit pixel row corresponding thereto, and transmits a control signal supplied from the vertical scanning unit 112 to each of the unit pixels described above.

That is to say, the unit pixel 141 is connected to the vertical signal line 121 assigned to a column (unit pixel column) to which the unit pixel 141 belongs, and the control line 125 assigned to a unit pixel row to which the unit pixel 141 belongs. The unit pixel 141 is driven on the basis of the control signal supplied through the control line 125, and supplies an electric signal obtained in the unit pixel 141 to the A/D converter 103 through the vertical signal line 121.

It should be noted that although the control line 125 in each row is indicated by one line in FIG. 3, the control line 125 in each row may be configured by a plurality of control lines.

<Configuration of Unit Pixel>

Figure 4:
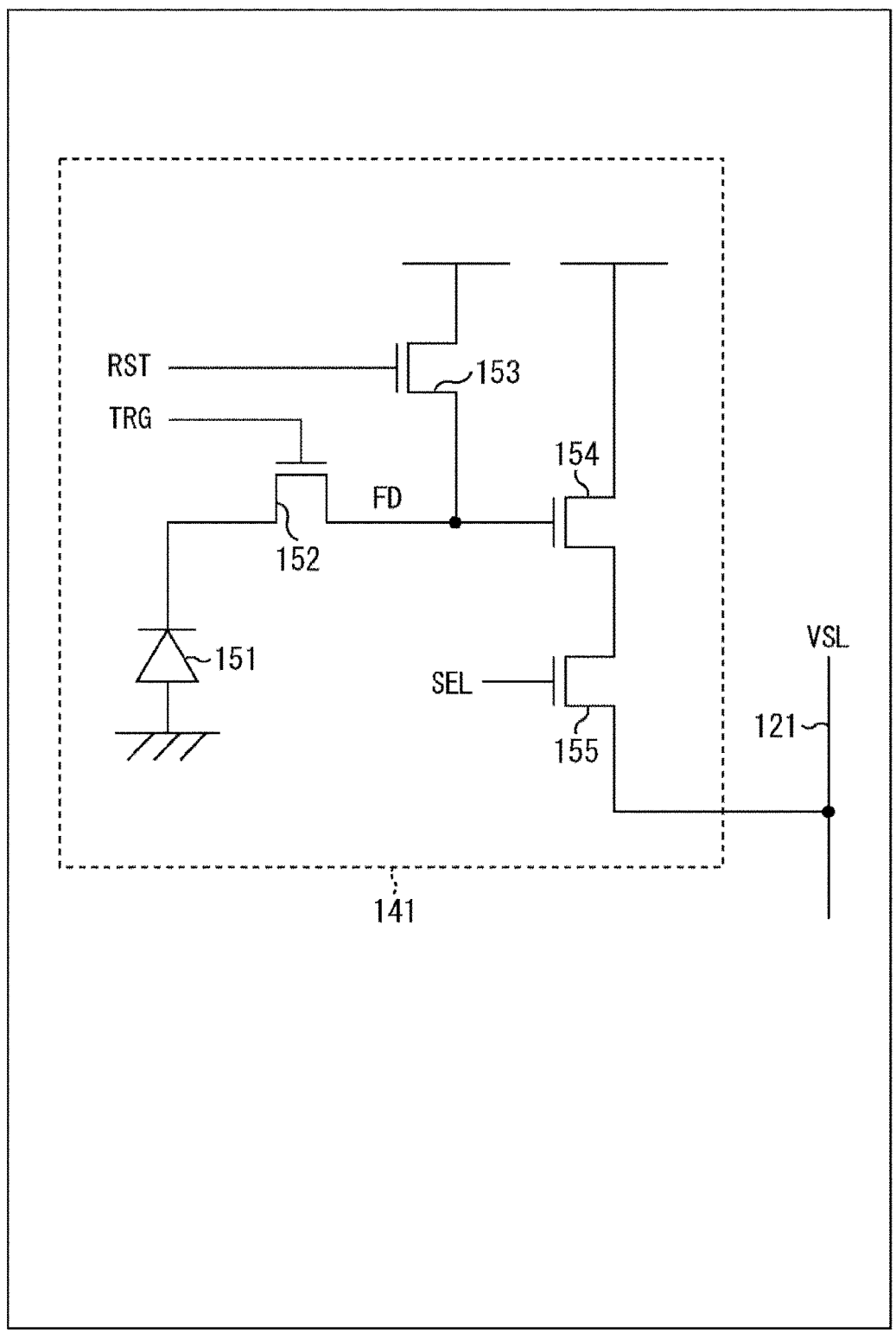
FIG. 4 is a diagram illustrating a main configuration example of a unit pixel.

FIG. 4 is a diagram illustrating an example of a main configuration of a circuit configuration of the unit pixel 141. As illustrated in FIG. 4, the unit pixel 141 includes a photodiode (PD) 151, a transfer transistor 152, a reset transistor 153, an amplifying transistor 154, and a selection transistor 155.

The photodiode (PD) 151 photoelectrically converts received light into photocharge (here, photoelectron) in an amount of charge in accordance with an amount of the light, and accumulates the photocharge. The accumulated photocharge is read at predetermined timing. An anode electrode of the photodiode (PD) 151 is connected to a ground (pixel ground) of the pixel region, and a cathode electrode thereof is connected to a floating diffusion (FD) through the transfer transistor 152. As a matter of course, a system may be employed in which the cathode electrode of the photodiode (PD) 151 is connected to a power supply (pixel power supply) of the pixel region, and the anode electrode thereof is connected to the floating diffusion (FD) through the transfer transistor 152, and photocharge is read as a photohole.

The transfer transistor 152 controls reading of the photocharge from the photodiode (PD) 151. A drain electrode of the transfer transistor 152 is connected to the floating diffusion, and a source electrode thereof is connected to the cathode electrode of the photodiode (PD) 151. Also, a transfer control line (TRG) is connected to a gate electrode of the transfer transistor 152. The transfer control line (TRG) transmits a transfer control signal supplied from the vertical scanning unit 112. That is to say, the transfer control line (TRG) is included in the control line 125 in FIG. 3.

When a signal of the transfer control line (TRG) (in other words, a gate potential of the transfer transistor 152) is in an OFF state, the photocharge is not transferred from the photodiode (PD) 151 (the photocharge is accumulated in the photodiode (PD) 151). To the contrary, when the signal of the transfer control line (TRG) is in an ON state, the photocharge accumulated in the photodiode (PD) 151 is transferred to the floating diffusion (FD).

The reset transistor 153 resets a potential of the floating diffusion (FD). A drain electrode of the reset transistor 153 is connected to a power supply potential and a source electrode thereof is connected to the floating diffusion (FD). Also, a reset control line (RST) is connected to a gate electrode of the reset transistor 153. The reset control line (RST) transmits a reset control signal supplied from the vertical scanning unit 112. That is to say, the reset control line (RST) is included in the control line 125 in FIG. 3.

When a signal of the reset control line (RST) (in other words, a gate potential of the reset transistor 153) is in an OFF state, the floating diffusion (FD) is cut off from the power supply potential. To the contrary, when the signal of the reset control line (RST) is in an ON state, charge of the floating diffusion (FD) is discarded in the power supply potential, and the floating diffusion (FD) is reset.

The amplifying transistor 154 amplifies and outputs a potential change of the floating diffusion (FD) as an electric signal (analog signal). A gate electrode of the amplifying transistor 154 is connected to the floating diffusion (FD), a drain electrode thereof is connected to a source follower power supply voltage, and a source electrode thereof is connected to a drain electrode of the selection transistor 155.

For example, the amplifying transistor 154 outputs the potential of the floating diffusion (FD) reset by the reset transistor 153 to the selection transistor 155 as a reset signal (reset level). Also, the amplifying transistor 154 outputs the potential of the floating diffusion (FD) in which the photocharge has been transferred by the transfer transistor 152 to the selection transistor 155 as a light accumulation signal (signal level).

The selection transistor 155 controls output of the electric signal supplied from the amplifying transistor 154 to the vertical signal line (VSL) 121 (in other words, the A/D converter 103). A drain electrode of the selection transistor 155 is connected to the source electrode of the amplifying transistor 154, and a source electrode thereof is connected to the vertical signal line 121. Also, a selection control line (SEL) is connected to a gate electrode of the selection transistor 155. The selection control line (SEL) transmits a selection control signal supplied from the vertical scanning unit 112. That is to say, the selection control line (SEL) is included in the control line 125 in FIG. 3.

When a signal of the selection control line (SEL) (in other words, a gate potential of the selection transistor 155) is in an OFF state, the amplifying transistor 154 and the vertical signal line 121 are electrically cut off from each other. Therefore, a reset signal, a pixel signal or the like is not output from the unit pixel 141 in this state. To the contrary, when the selection control line (SEL) is in an ON state, the unit pixel 141 is in a selected state. That is to say, the amplifying transistor 154 and the vertical signal line 121 are electrically connected, and a signal output from the amplifying transistor 154 is supplied to the vertical signal line 121 as a pixel signal of the unit pixel 141. In other words, the reset signal, the pixel signal or the like is read from the unit pixel 141.

<Configuration of A/D Converter>

Figure 5:
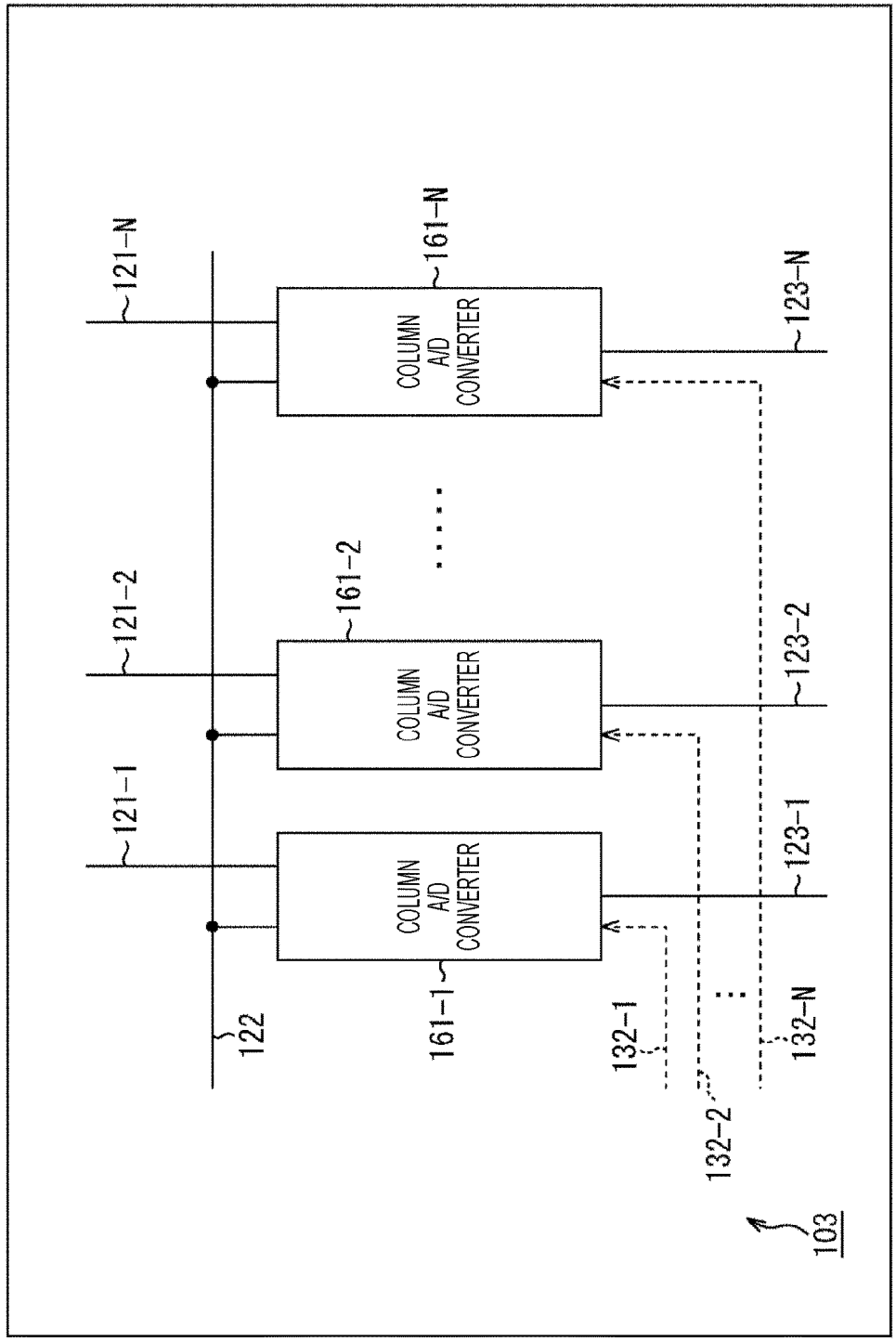
FIG. 5 is a diagram illustrating a main configuration example of an A/D converter.

Next, a configuration example of the A/D converter 103 (FIG. 2) will be described with reference to FIG. 5. As illustrated in FIG. 5, the A/D converter 103 includes column A/D converters 161-1 to 161-N. Hereinafter, the column A/D converters 161-1 to 161-N are referred to as a column A/D converter 161 when there is no need to discriminate the column A/D converters 161-1 to 161-N from one another for explanation thereof. The column A/D converter 161 is provided in each column (unit pixel column) in the pixel array 101.

In addition, as illustrated in FIG. 5, each of the column A/D converters 161 (column A/D converters 161-1 to 161-N) is connected to the vertical signal line 121 (vertical signal lines 121-1 to 121-N) in a column corresponding thereto, and to the reference signal line 122. The column A/D converter 161 performs A/D conversion by a single-slope A/D conversion method. In other words, each of the column A/D converters 161 performs A/D conversion of a signal read from the unit pixel 141 in a column corresponding thereto, and supplied through the vertical signal line 121 of the column, with the use of a reference signal supplied from the reference voltage generation unit 102 through the reference signal line 122.

Also, as illustrated in FIG. 5, each of the column A/D converters 161 is connected to the signal line 123 (signal lines 123-1 to 123-N) in a column corresponding thereto. Each of the column A/D converters 161 supplies a result of the A/D conversion obtained therein to the horizontal transfer unit 104 through the signal line 123 corresponding thereto.

Furthermore, as illustrated in FIG. 5, each of the column A/D converters 161 is connected to the control line 132 (control lines 132-1 to 132-N). Each of the column A/D converters 161 is driven on the basis of a control signal supplied from the control unit 111 (in other words, control of the control unit 111) through the control line 132 corresponding thereto.

<Configuration of Column A/D Converter>

Figure 6:
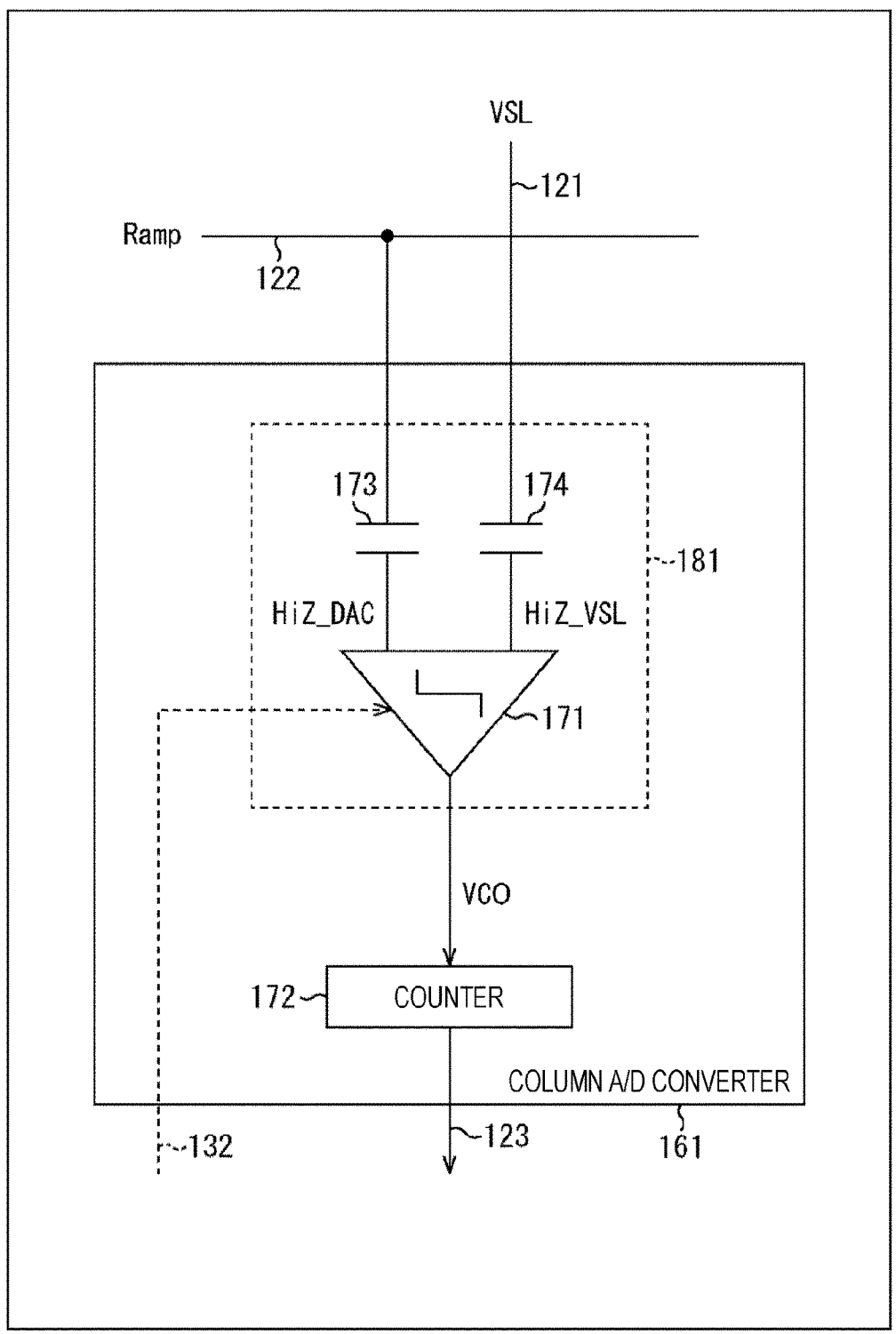
FIG. 6 is a diagram illustrating a main configuration example of a column A/D converter.

Next, a configuration example of the column A/D converter 161 (FIG. 5) will be described with reference to FIG. 6. As illustrated in FIG. 6, the column A/D converter 161 includes a comparison unit 171, a counter 172, and capacitors 173 and 174.

Regarding the comparison unit 171 with two inputs and one output, an input terminal HiZ_VSL thereof is connected through the capacitor 174 to the vertical signal line 121 of a column corresponding thereto, an input terminal HiZ_DAC thereof is connected through the capacitor 173 to the reference signal line 122, and an output terminal VCO thereof is connected to the counter 172.

The comparison unit 171 compares (makes a comparison between signal levels of) an input signal input to the input terminal HiZ_VSL through the vertical signal line 121 and the capacitor 174 (for example, an analog signal read from the unit pixel 141) and a reference signal input to the input terminal HiZ_DAC through the reference signal line 122 and the capacitor 173, and outputs a comparison result thereof to the counter 172. That is to say, the comparison unit 171 outputs, from the output terminal VCO, a signal indicating which of signal levels of the input signal and the reference signal is larger, and supplies the signal to the counter 172.

For example, the signal indicating the comparison result is 1-bit digital data. For example, when the signal level of the reference signal (signal input to the input terminal HiZ_DAC) is larger than the signal level of the input signal (signal input to the input terminal HiZ_VSL), a value of the signal indicating the comparison result is "0," and in the reverse case, the value is "1." As a matter of course, the value of the signal may be obtained in a reverse manner. Also, the signal indicating the comparison result has an arbitrary bit length, and may be information of a plurality of bits.

Regarding the counter 172, an input terminal thereof is connected to the output terminal VCO of the comparison unit 171 and an output terminal thereof is connected to the signal line 123 of a column corresponding thereto. The counter 172 is supplied with the comparison result from the comparison unit 171. The counter 172 counts time from start of counting to reversal of the comparison result (change in the signal level of the output terminal VCO) (for example, the number of clocks of a clock signal). In addition, the counter 172 outputs, at a time point of the reversal of the comparison result, a count value obtained until then to the horizontal transfer unit 104 through the signal line 123 as a result of A/D conversion of the input signal input to the input terminal HiZ_VSL of the comparison unit 171 (that is to say, digital data of the signal read from the unit pixel 141).

The capacitors 173 and 174 are capacitors of a fixed capacitance (with a predetermined capacitance).

It should be noted that, as illustrated in FIG. 6, the comparison unit 171, and the capacitors 173 and 174 may be collectively a comparison unit 181 (the capacitors 173 and 174 may be included in a configuration of the comparison unit).

The present technology may be applied to the comparison unit 181 (or the comparison unit 171) having the above configuration.

In other words, a configuration may be employed in which the gate of an input transistor of the comparison unit 181 which compares signal levels of two signals input thereto and outputs a comparison result can be short-circuited to a potential which reduces a gate-to-source voltage of the input transistor.

Also, the present technology may be applied to the column A/D converter 161 described above. That is to say, the column A/D converter 161 may be configured to include the comparison unit 181 to which the present technology is applied and the counter 172 which performs counting until the comparison result output from the comparison unit 181 is changed.

In that case, the comparison unit 181 compares signal levels of an input analog signal and a predetermined reference signal, and outputs a comparison result thereof to the counter 172. The counter 172 performs counting until the comparison result is changed, and outputs a count value thereof as digital data obtained by A/D converting the input analog signal.

In addition, the column A/D converter 161 to which the present technology is applied in such a manner may be used as a configuration of the image sensor 100 as described above. In that case, the comparison unit 181 compares signal levels of a signal read from the unit pixel 141 formed in the pixel array 101 as a pixel region, and the reference signal. The counter 172 outputs a count value obtained until the comparison result output from the comparison unit 181 is changed as digital data obtained by A/D converting the signal read from the unit pixel 141.

Additionally, the A/D converter to which the present technology is applied may be used as a column A/D converter provided in each column in the pixel array 101. In that case, the comparison unit 181 compares signal levels of a signal read from the unit pixel 141 in the unit pixel column corresponding thereto in the pixel array 101, and the reference signal.

<Configuration of Comparison Unit>

Figure 7:
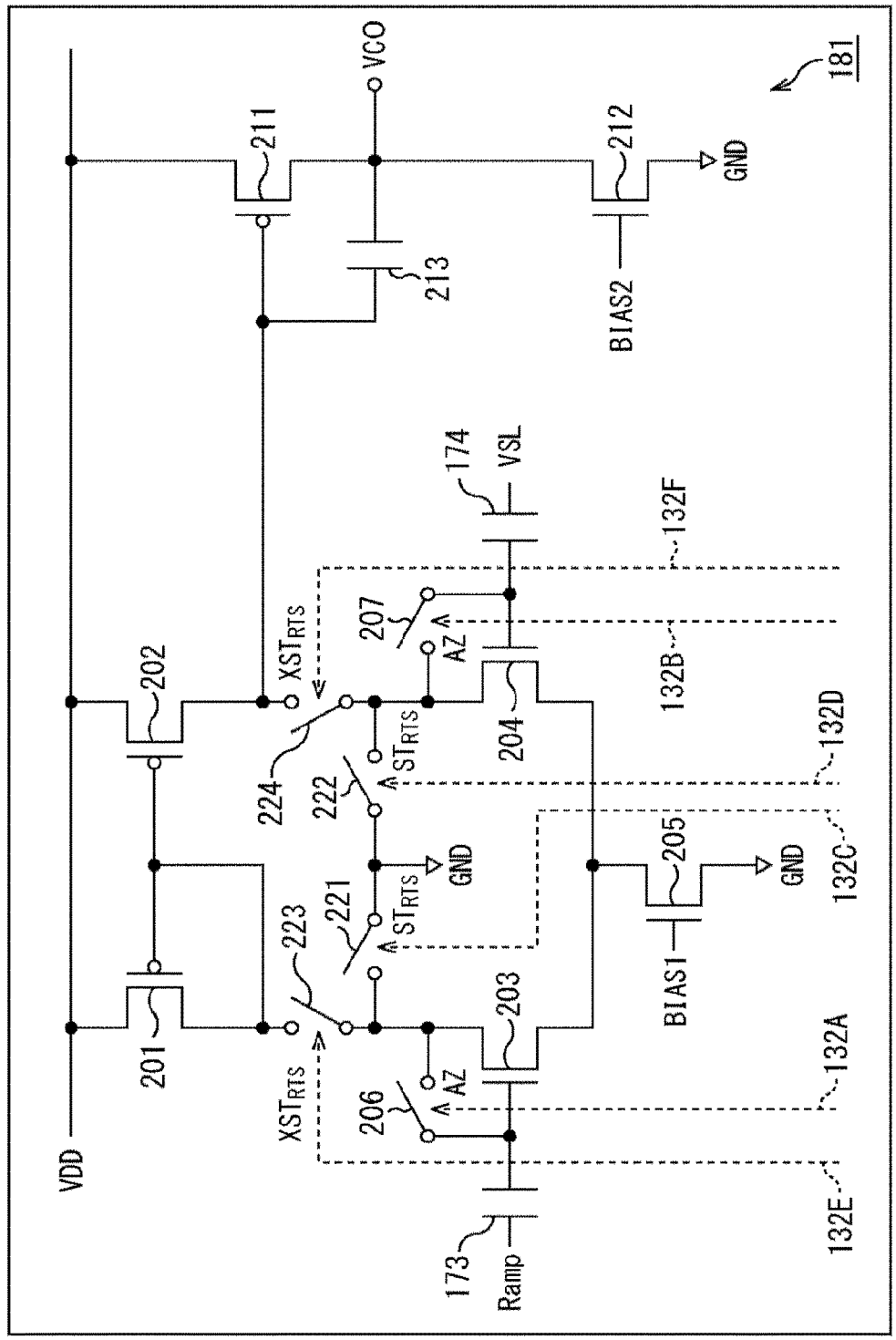
FIG. 7 is a diagram illustrating a main configuration example of a comparison unit.

A main configuration example of the comparison unit 181 is illustrated in FIG. 7. As illustrated in FIG. 7, the comparison unit 181 includes, as a differential stage of the comparison unit 171, transistors 201 to 205, and switches 206 and 207. Also, the comparison unit 181 includes, as an amplifier stage of the comparison unit 171, transistors 211 and 212, and a capacitor 213.

The configuration thereof is similar to that of a common comparison unit described with reference to FIG. 1. The transistors 203 and 204 are input transistors which amplify an input signal input from respective input terminals (HiZ_DAC, HiZ_VSL). A gate of the transistor 203 is connected to the input terminal HiZ_DAC, and a reference signal (Ramp) is input thereto through the capacitor 173. Also, a gate of the transistor 204 is connected to the input terminal HiZ_VSL, and a signal (VSL) read from the unit pixel 141 is input thereto through the capacitor 174.

It should be noted that these transistors 203 and 204 may be each a negative metal oxide semiconductor (NMOS). Also, in that case, a potential which reduces a gate-to-source voltages of the transistors 203 and 204 may be a ground potential (GND). That is to say, it may be configured such that the gates of the transistors 203 and 204 can be short-circuited to the ground potential.

Also, the switches 206 and 207 are auto-zero units capable of performing auto-zeroing by short-circuiting the gates and drains of the transistors 203 and 204, respectively, to short-circuit an input side and an output side of the comparison unit 181. More specifically, the switch 206 is driven in accordance with a control signal AZ supplied from the control unit 111 through a control line 132A (is driven on the basis of the control of the control unit 111), and performs auto-zeroing by short-circuiting the gate and the drain of the transistor 203. The switch 207 is driven in accordance with the control signal AZ supplied from the control unit 111 through a control line 132B (is driven on the basis of the control of the control unit 111), and performs auto-zeroing by short-circuiting the gate and the drain of the transistor 204.

In addition, in a state where the auto-zero units (switches 206 and 207) are performing the auto-zeroing, in other words, in a state where the gates and the drains of the transistors 203 and 204 are being short-circuited, the drains of the transistors 203 and 204 may be short-circuited to the potential which reduces the gate-to-source voltages of the transistors 203 and 204. By doing so, the gates of the transistors 203 and 204 can be also short-circuited to the potential which reduces the gate-to-source voltages.

In addition, the comparison unit 181 further includes, as a differential stage of the comparison unit 171, switches 221 to 224.

The switches 221 and 222 are short-circuit units capable of short-circuiting the gates of the transistors 203 and 204, respectively, to the potential which reduces the gate-to-source voltages thereof. More specifically, the switch 221 is driven in accordance with a control signal $ST_{RTS}$ supplied from the control unit 111 through a control line 132C (is driven on the basis of the control of the control unit 111), and short-circuits the drain of the transistor 203 to the ground potential (GND). Also, the switch 222 is driven in accordance with the control signal $ST_{RTS}$ supplied from the control unit 111 through a control line 132D (is driven on the basis of the control of the control unit 111), and short-circuits the drain of the transistor 204 to the ground potential.

As described above, the transistors 203 and 204 are NMOS transistors, the switches 206 and 207 perform the auto-zeroing, and thereby the gates and the drains of the transistors 203 and 204 are short-circuited. Consequently, the switches 221 and 222 can short-circuit the drains of the transistors 203 and 204, respectively, to the ground potential to short-circuit the gates of the transistors 203 and 204, respectively, to the potential which reduces the gate-to-source voltages thereof.

As described above, transistors are not brought into a constant operating state, an absolute value of a gate-to-source voltage (Vgs) thereof is reduced regularly or irregularly (occasionally), and thereby RTS noise can be reduced. Consequently, the comparison unit 181 can output a more accurate comparison result. Also, the column A/D converter 161 (A/D converter 103) can perform A/D conversion more accurately. In addition, the image sensor 100 can suppress reduction in image quality of a picked-up image obtained in the image sensor 100.

It should be noted that with the above configuration, the switches 221 and 222 can be concealed (made invisible) from the input side when the comparison unit 181 is in an operating state (auto-zeroing is not being performed). Consequently, it is possible to suppress an increase in an input capacitance.

The switches 223 and 224 control connection of the transistors 203 and 204 to the output side of the comparison unit 181, respectively. More specifically, the switch 223 is supplied with a control signal $XST_{RTS}$ from the control unit 111 through a control line 132E. Also, the switch 224 is supplied with the control signal $XST_{RTS}$ from the control unit 111 through a control line 132F.

The control signal $XST_{RTS}$ takes a value opposite to that of the control signal $ST_{RTS}$. That is to say, when the switches 221 and 222 are in an ON state, the switches 223 and 224 are in an OFF state, and when the switches 221 and 222 are in an OFF state, the switches 223 and 224 are in an ON state.

That is to say, the switches 223 and 224 are cutting units which cut off the transistors 203 and 204 as well as the switches 221 and 222 from the output side of the comparison unit 181, respectively, when the switches 221 and 222 are short-circuiting the gates of the transistors 203 and 204 to the ground potential, respectively. By the above configuration, it is possible to suppress occurrence of a leak.

It should be noted that when the switches 221 and 222 are cutting the gates of the transistors 203 and 204 from the ground potential, respectively, the switches 223 and 224 connect the transistors 203 and 204 as well as the switches 221 and 222 to the output side of the comparison unit 181, respectively.

<Control Process>

It should be noted that in a period of a non-operating state of the comparison unit 181, the gates of the transistors 203 and 204 may be short-circuited to the potential which reduces the gate-to-source voltages thereof.

For example, in a period of a non-operating state of each of the transistors 203 and 204, the control unit 111 may cause the switches 221 and 222 to short-circuit the gates of the transistors 203 and 204, respectively, to the potential which reduces the gate-to-source voltages thereof.

Also, for example, the control unit 111 determines whether the transistors 203 and 204 are in the period of a non-operating state, and when the transistors 203 and 204 are determined to be in the period of a non-operating state, the control unit 111 may cause the switches 221 and 222 to short-circuit the gates of the transistors 203 and 204, respectively, to the potential which reduces the gate-to-source voltages thereof. Also, For example, the control unit 111 determines whether the period of a non-operating state of each of the transistors 203 and 204 ends, and when it is determined that the period of a non-operating state ends, the control unit 111 may cause the switches 221 and 222 to cut off the gates of the transistors 203 and 204, respectively, from the potential which reduces the gate-to-source voltages thereof.

Figure 8:
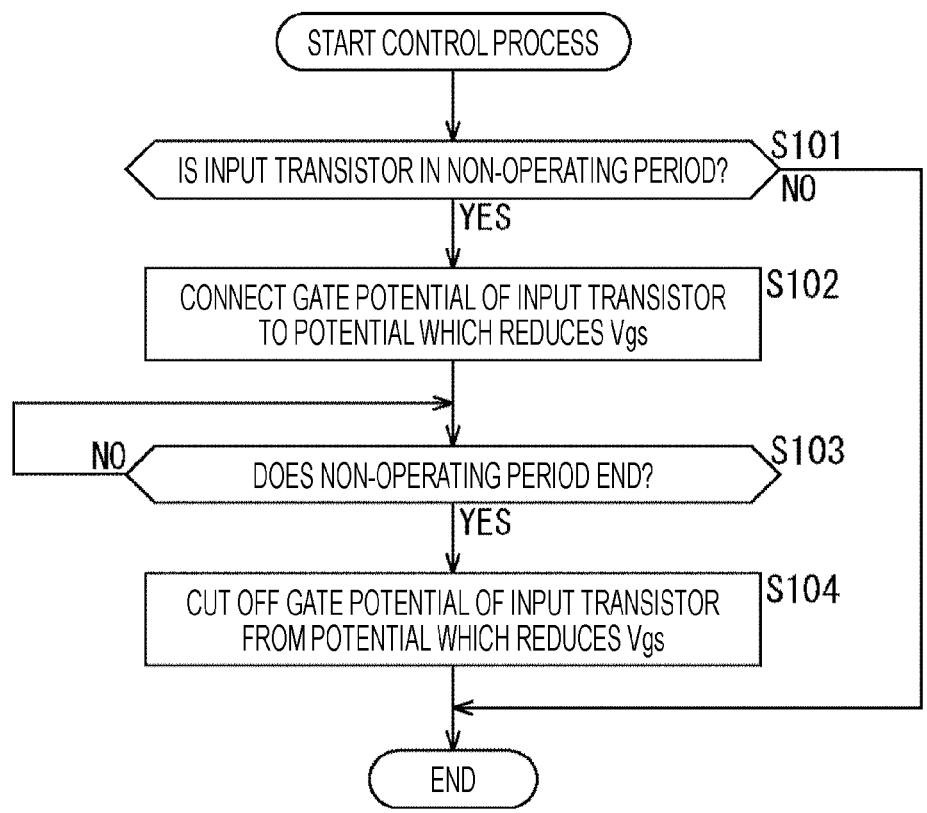
FIG. 8 is a flowchart for explaining an example of a flow of a control process.

An example of a flow of a control process executed by the control unit 111 will be described with reference to a flowchart in FIG. 8.

When the control process is started, the control unit 111 determines in Step S101 whether an input transistor (amplifying transistor, in the case of the example in FIG. 7, the transistors 203 and 204) is in a period of a non-operating state (non-operating period). When the input transistor is determined to be in the non-operating period, the process proceeds to Step S102.

In Step S102, the control unit 111 turns the switches 221 and 222 into an ON state, thereby connecting a gate potential of each of the input transistors to a potential which reduces a gate-to-source voltage (Vgs) of each of the input transistors (in the case of the example in FIG. 7, the ground potential). At that time, the control unit 111 may turn the switches 223 and 224 into an OFF state.

In Step S103, the control unit 111 determines whether the non-operating period ends, and waits until it is determined that the non-operating period ends. When it is determined that the non-operating period ends, the process proceeds to Step S104.

In Step S104, the control unit 111 turns the switches 221 and 222 into an OFF state, thereby cutting off the gate potential of each of the input transistors from the potential which reduces the gate-to-source voltage (Vgs) of each of the input transistors (in the case of the example in FIG. 7, the ground potential). At that time, the control unit 111 may turn the switches 223 and 224 into an ON state.

When the process in Step S104 ends, the control process ends. Also, when it is determined in Step S101 that the input transistors are not in the non-operating period (the transistors 203 and 204) are in a period of an operating state (operating period)), the control process ends.

By repeatedly performing the control process in the manner as described above while the comparison unit 181 (the column A/D converter 161, the A/D converter 103) may be driven, for example, in a period during which the image sensor 100 performs a reading process for reading a signal from the pixel array 101, the control unit 111, without bringing the input transistors (amplifying transistors) into a constant operating state, and in a non-operating period thereof, can reduce an absolute value of a gate-to-source voltage (Vgs) thereof and can reduce RTS noise. Consequently, the comparison unit 181 can output a more accurate comparison result. Also, the column A/D converter 161 (A/D converter 103) can perform A/D conversion more accurately. In addition, the image sensor 100 can suppress reduction in image quality of a picked-up image obtained in the image sensor 100.

<Non-Operating Period>

Figure 9:
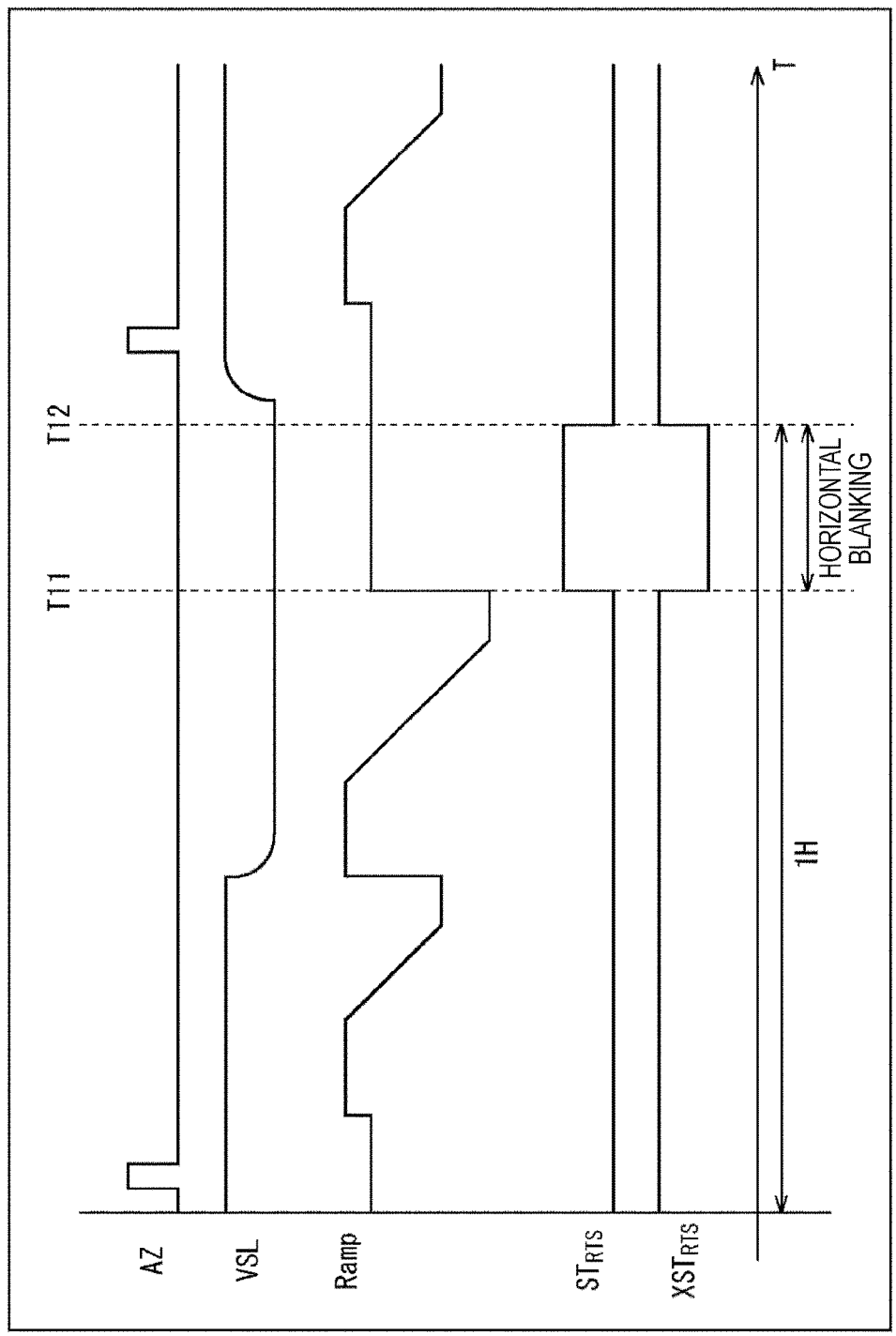
FIG. 9 is a timing chart for explaining an example of execution timing of the control process.

It should be noted that the non-operating period described above is arbitrary. For example, as illustrated in FIG. 9, the horizontal blanking period (time T11 to time T12 (FIG. 9)) in the process for reading a signal from the pixel array 101 performed by the image sensor 100 may be employed as the non-operating period.

Figure 10:
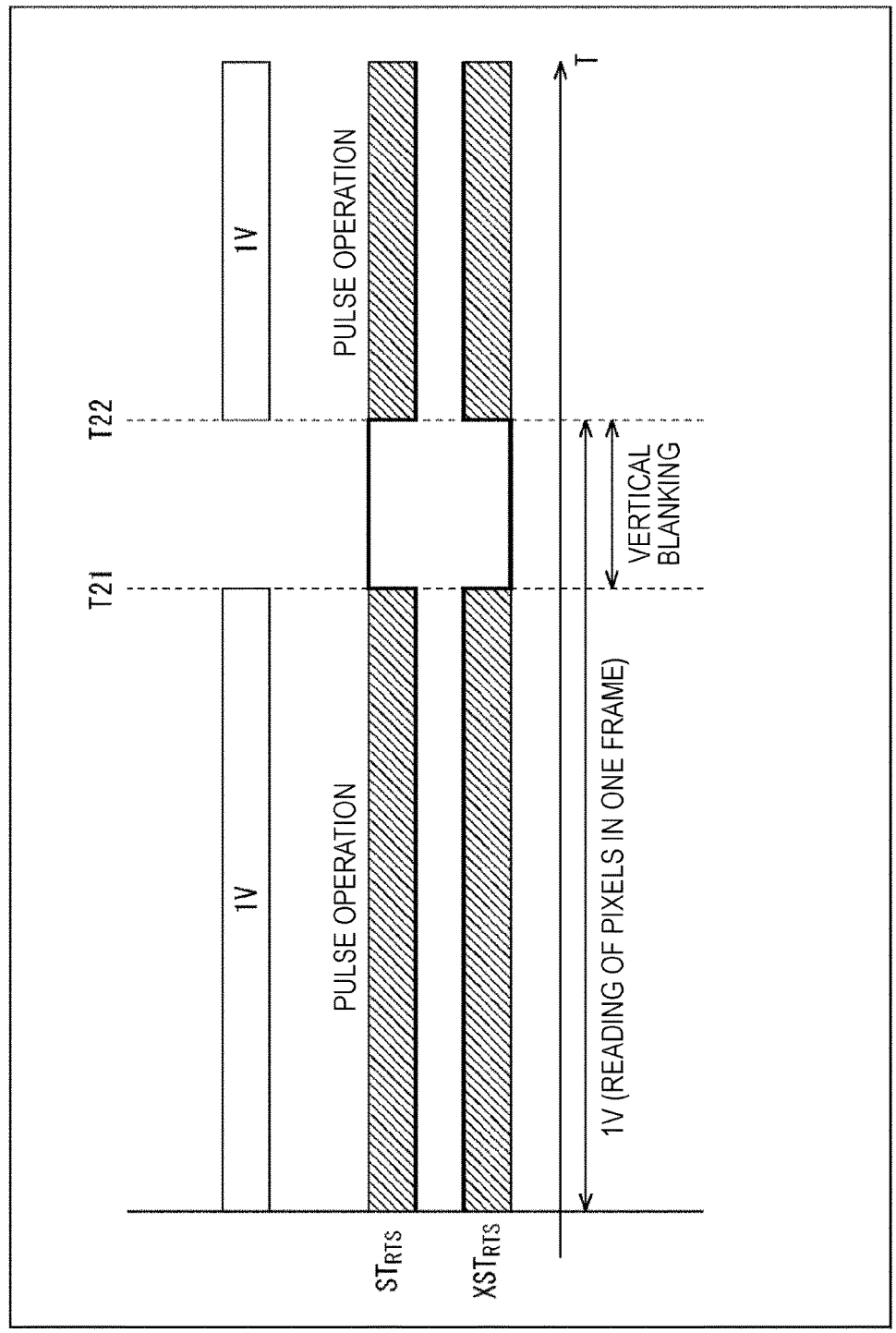
FIG. 10 is a timing chart for explaining an example of execution timing of the control process.

Also, as illustrated in FIG. 10, for example, the vertical blanking period (time T21 to time T22 (FIG. 10)) in the process for reading a signal from the pixel array 101 performed by the image sensor 100 may be employed as the non-operating period.

<Other Configuration 1 of Comparison Unit>

Figure 11:
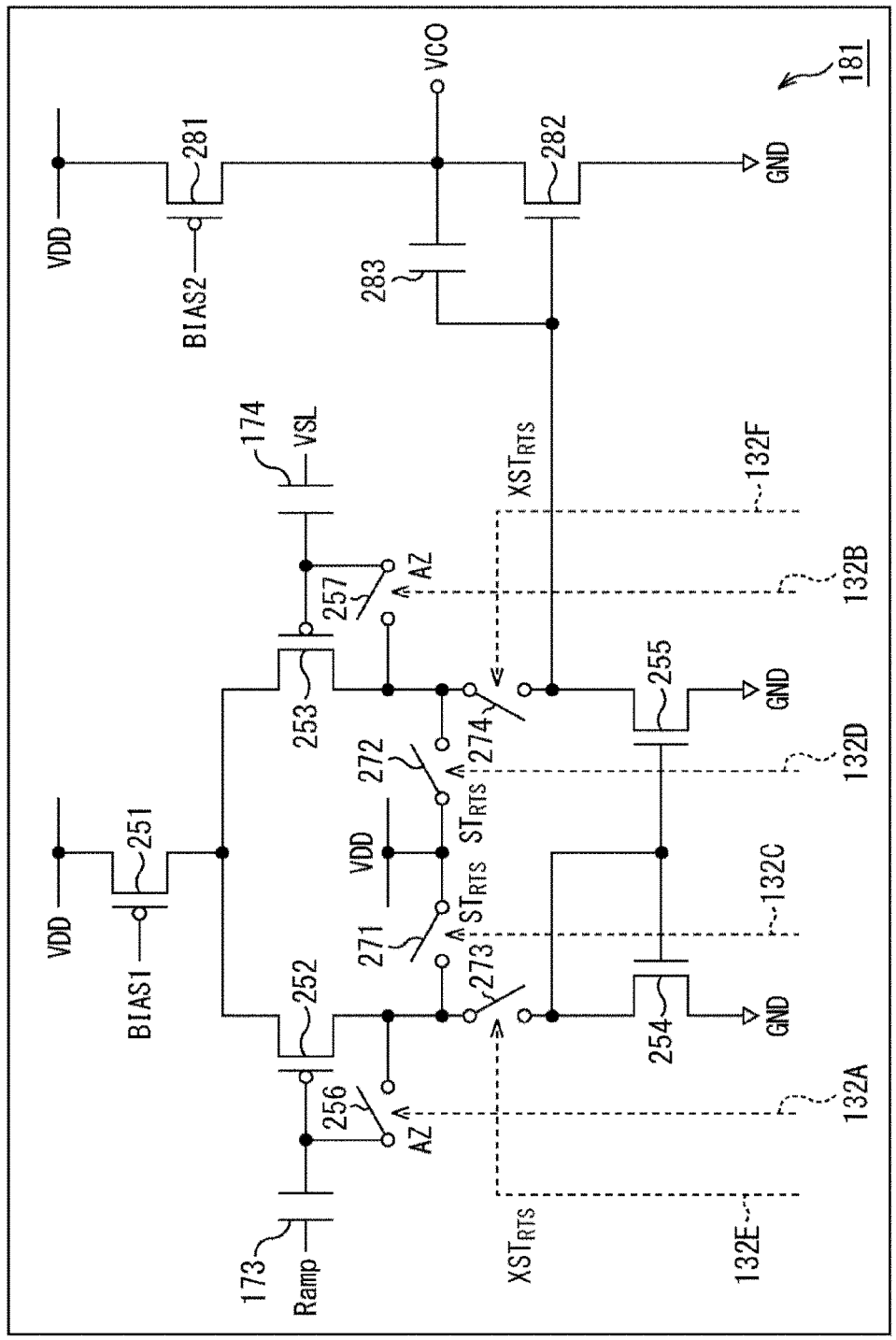
FIG. 11 is a diagram illustrating a main configuration example of the comparison unit.

The configuration of the comparison unit 181 is not limited to the example described above. For example, as illustrated in FIG. 11, the input transistor (amplifying transistor) of the comparison unit 181 may be a positive metal oxide semiconductor (PMOS). In that case, a potential which reduces the gate-to-source voltage of the amplifying transistor may be employed as a power supply potential. That is to say, a gate of the input transistor may be short-circuited to the power supply potential.

In the case of an example in FIG. 11, the comparison unit 181 includes, as a differential stage of the comparison unit 171, transistors 251 to 255, and switches 256 and 257. Also, the comparison unit 181 includes, as an amplifier stage of the comparison unit 171, transistors 281 and 282, and a capacitor 283.

In that case, the transistors 252 and 253 serve as input transistors, and amplify input signals input from respective input terminals (HiZ_DAC, HiZ_VSL). That is to say, the transistors 252 and 253 respectively correspond to the transistors 203 and 204 in FIG. 7. A gate of the transistor 252 is connected to the input terminal HiZ_DAC, and a reference signal (Ramp) is input thereto through the capacitor 173. Also, a gate of the transistor 253 is connected to the input terminal HiZ_VSL, and a signal (VSL) read from the unit pixel 141 is input thereto through the capacitor 174.

Also, the switches 256 and 257 respectively correspond to the switches 206 and 207 in FIG. 7, and are auto-zero units capable of performing auto-zeroing by respectively short-circuiting the gates and drains of the transistors 252 and 253 to short-circuit the input side and the output side of the comparison unit 181. Similarly to the switches 206 and 207, the switches 256 and 257 are driven under the control of the control unit 111.

In addition, the comparison unit 181 further includes, as a differential stage of the comparison unit 171, switches 271 to 274. The switches 271 and 272 respectively correspond to the switches 221 and 222 in FIG. 7, and are short-circuit units capable of respectively short-circuiting the gates of the transistors 252 and 253 to a potential which reduces a gate-to-source voltages thereof. Similarly to the switches 221 and 222, the switches 271 and 272 are driven under the control of the control unit 111.

However, the switches 271 and 272 short-circuit the drains of the transistors 252 and 253, respectively, to the power supply potential (VDD). The transistors 252 and 253 are PMOS transistors, the switches 256 and 257 perform the auto-zeroing, and thereby the gates and the drains of the transistors 252 and 253 are short-circuited. Consequently, the switches 271 and 272 can short-circuit the drains of the transistors 252 and 253, respectively, to the power supply potential to short-circuit the gates of the transistors 252 and 253, respectively, to the potential which reduces the gate-to-source voltages thereof.

By doing so, the comparison unit 181 can suppress RTS noise similarly to the case of FIG. 7.

It should be noted that the switches 273 and 274 respectively correspond to the switches 223 and 224 in FIG. 7, and control connection of the transistors 252 and 253 to the output side of the comparison unit 181. Similarly to the switches 223 and 224, the switches 273 and 274 are driven under the control of the control unit 111.

Since the control signal $XST_{RTS}$ which controls the switches 273 and 274 takes a value opposite to that of the control signal $ST_{RTS}$ which controls the switches 271 and 272, the switches 273 and 274 serve as cutting units which cut off the transistors 252 and 253 as well as the switches 271 and 272 from the output side of the comparison unit 181 when the switches 271 and 272 are short-circuiting the gates of the transistors 252 and 253 to the ground potential. By the above configuration, it is possible to suppress occurrence of a leak.

<Other Configuration 2 of Comparison Unit>

Also, the input terminals HiZ_DAC and HiZ_VSL of the comparison unit 171 may be short-circuited to a potential which reduces a gate-to-source voltage of the input transistor. A main configuration example of the comparison unit 181 in that case is illustrated in FIG. 12.

Figure 12:
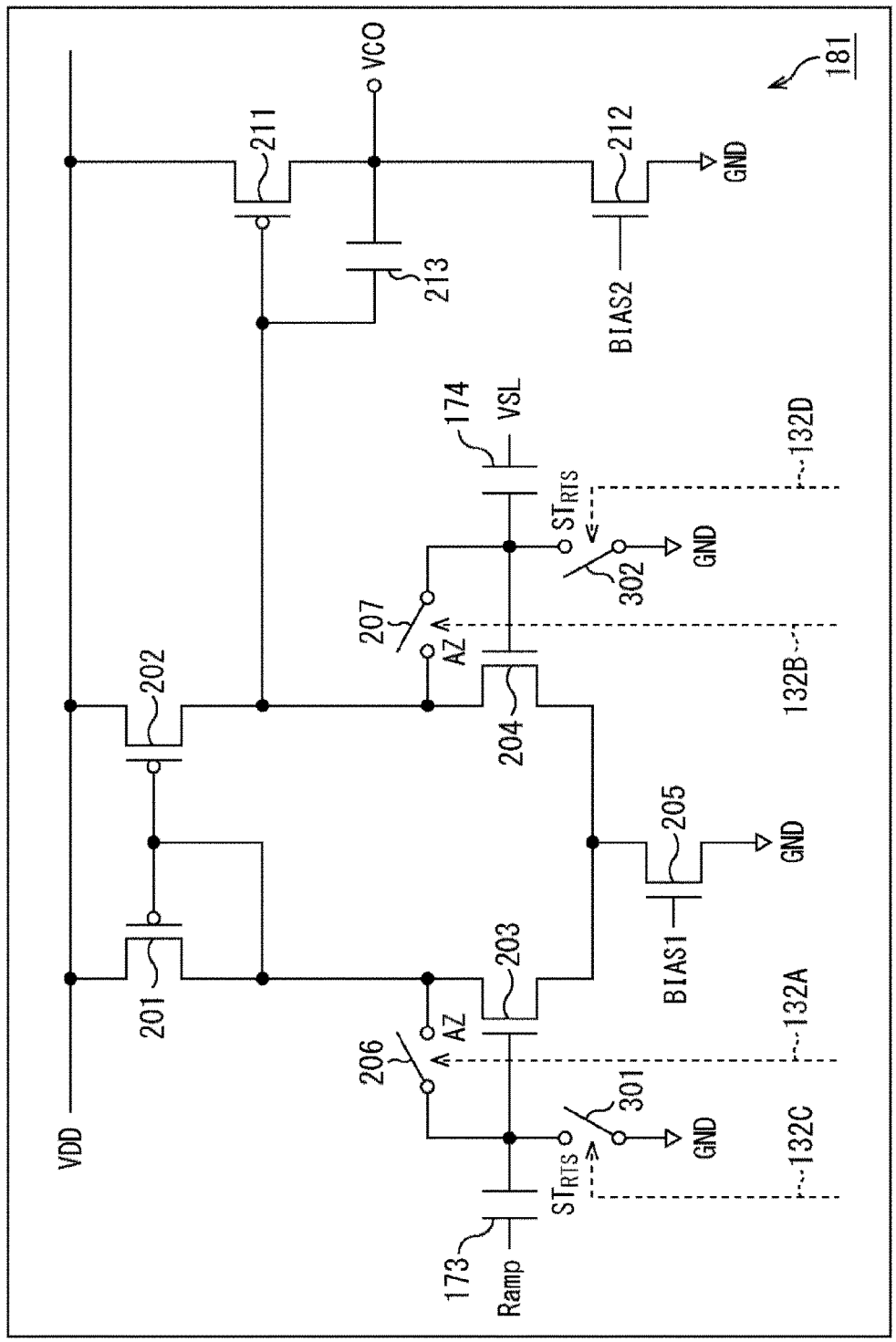
FIG. 12 is a diagram illustrating a main configuration example of the comparison unit.

In the case of the example in FIG. 12, although the comparison unit 181 has a configuration similar to that in the example in FIG. 7 basically, the comparison unit 181 includes switches 301 and 302 instead of the switches 221 to 224.

The switches 301 and 302 respectively correspond to the switches 221 and 222 in FIG. 7, and are short-circuit units capable of respectively short-circuiting the gates of the transistors 203 and 204 to the potential which reduces the gate-to-source voltages thereof (ground potential (GND)). Similarly to the switches 221 and 222, the switches 301 and 302 are driven under the control of the control unit 111. That is to say, the comparison unit 181 can suppress RTS noise also in this case similarly to the case of FIG. 7.

However, the switches 301 and 302 short-circuit not the drains but the gates of the transistors 203 and 204, respectively, to the ground potential (GND). Therefore, even when the auto-zeroing is not being performed, the switches 301 and 302 are capable of short-circuiting the gates of the transistors 203 and 204, respectively, to the potential which reduces the gate-to-source voltages thereof (ground potential (GND)).

<Other Configuration 3 of Comparison Unit>

It should be noted that the capacitors 173 and 174 may be omitted in the configuration of the column A/D converter 161 in FIG. 6. That is to say, the capacitors 173 and 174 may be omitted in the comparison unit 181. A main configuration example of the comparison unit 181 in that case is illustrated in FIG. 13.

Figure 13:
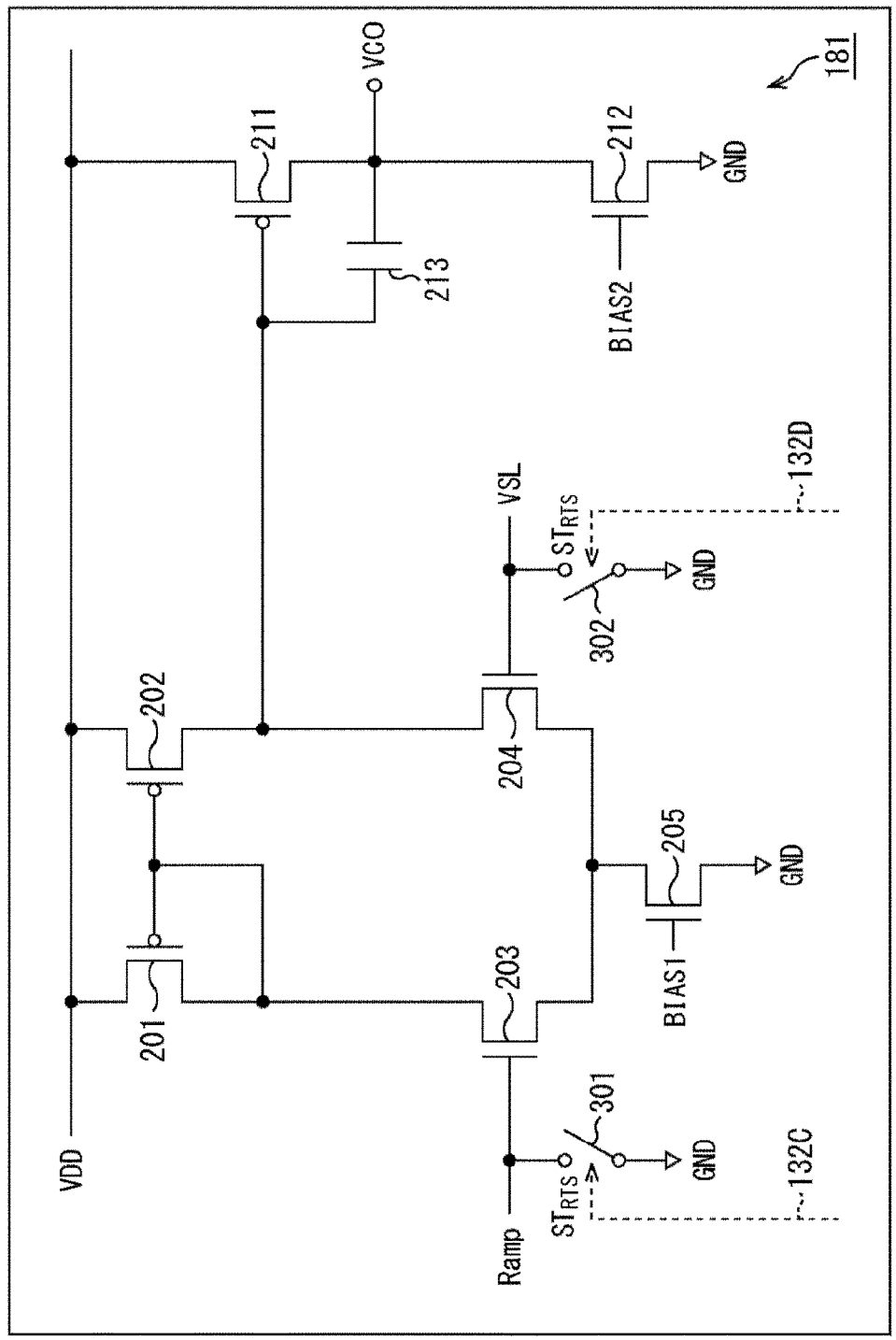
FIG. 13 is a diagram illustrating a main configuration example of the comparison unit.

The example illustrated in FIG. 13 is obtained by omitting the capacitors 173 and 174 from the configuration of the comparison unit 181 in the example in FIG. 12. In that case, the switches 206 and 207 which perform auto-zeroing are also omitted. As described above, even when the auto-zeroing is not being performed, the switches 301 and 302 are capable of short-circuiting the gates of the transistors 203 and 204, respectively, to the potential which reduces the gate-to-source voltages thereof (ground potential (GND)). Therefore, even in the case of FIG. 13, the switches 301 and 302 are capable of short-circuiting the gates of the transistors 203 and 204, respectively, to the potential which reduces the gate-to-source voltages thereof (ground potential (GND)) similarly to the case of FIG. 12. That is to say, the comparison unit 181 can suppress RTS noise also in this case similarly to the case of FIG. 7.

<Other Configuration 4 of Comparison Unit>

Also, the short-circuit unit and the cutting unit which cuts the short-circuit unit from the output side of the comparison unit may be provided in a short-circuit portion of a drain and a gate. A main configuration example of the comparison unit 181 in that case is illustrated in FIG. 14.

Figure 14:
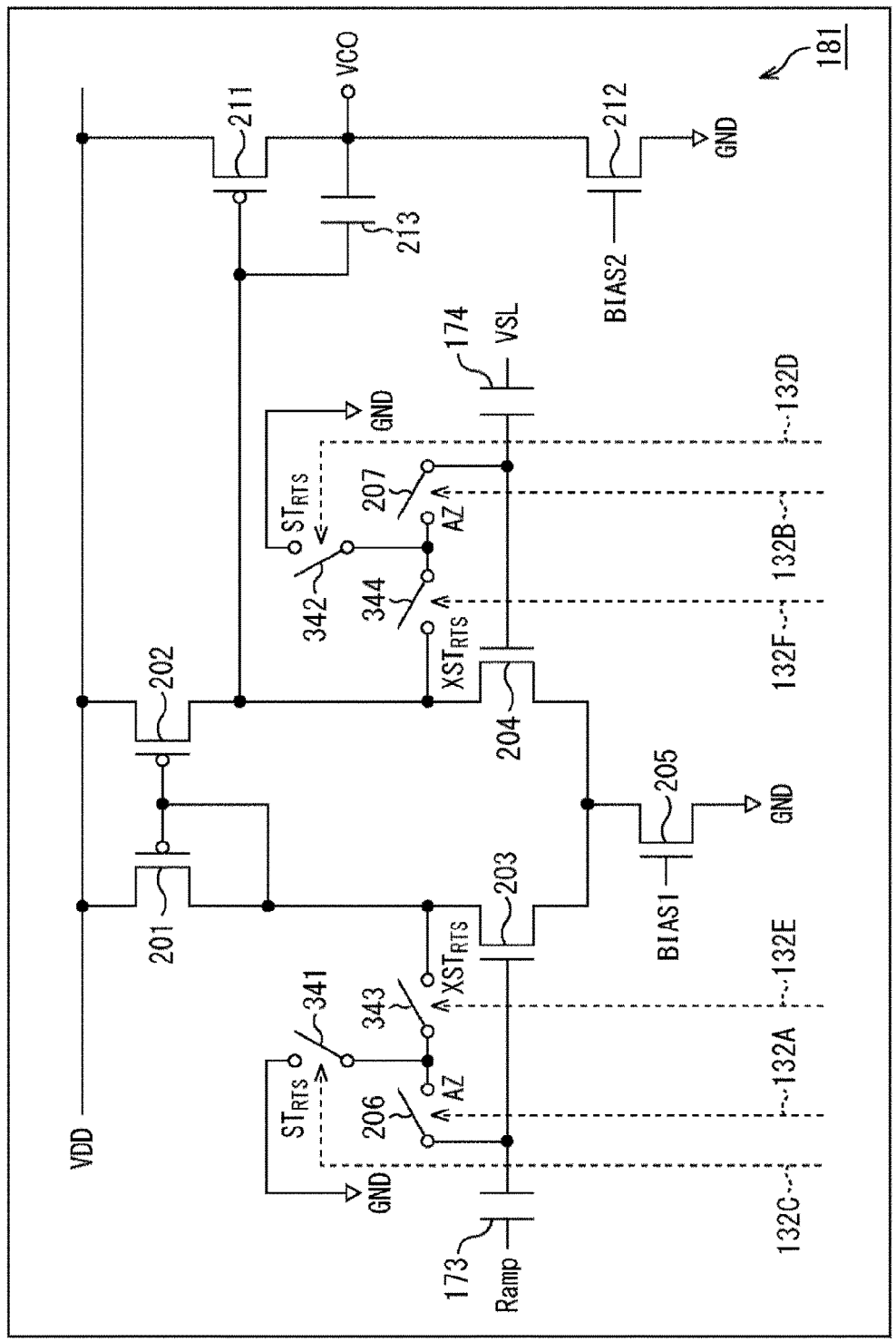
FIG. 14 is a diagram illustrating a main configuration example of the comparison unit.

In the case of the example in FIG. 14, although the comparison unit 181 has a configuration similar to that in the example in FIG. 7 basically, the comparison unit 181 includes switches 341 to 344 instead of the switches 221 to 224.

The switches 341 and 342 respectively correspond to the switches 221 and 222 in FIG. 7, and the switches 343 and 344 respectively correspond to the switches 223 and 224 in FIG. 7. That is to say, the switches 341 and 342 are driven similarly to the switches 221 and 222 in FIG. 7, respectively, and the switches 343 and 344 are driven similarly to the switches 223 and 224 in FIG. 7, respectively. In other words, the switches 341 and 342 are driven as the short-circuit unit described above, and the switches 343 and 344 are driven as the cutting unit described above.

Accordingly, the comparison unit 181 can suppress RTS noise also in this case similarly to the case of FIG. 7.

In the above, the description has been given for the case where the present technology is applied to the column A/D converter 161. However, the present technology can be applied also to arbitrary A/D converters other than the column A/D converter 161 (for example, the A/D converter 103). Also, the A/D converter to which the present technology is applied can be applied to arbitrary configurations other than the image sensor 100 (for example, circuits, apparatuses, and electronic devices). Similarly, the comparison unit to which the present technology is applied can be applied to arbitrary configurations other than the A/D converter (for example, circuits, apparatuses, and electronic devices). Similarly, the signal processing apparatus (configuration including an amplifying transistor and a short-circuit unit (for example, circuits, apparatuses, and electronic devices)) to which the present technology is applied can be applied to arbitrary configurations (for example, circuits, apparatuses, and electronic devices).

2. Second Embodiment

<Unit Pixel>

For example, the present technology can also be applied to a pixel array 101, a unit pixel 141. A main configuration example of the unit pixel 141 in that case is illustrated in FIG. 15.

Figure 15:
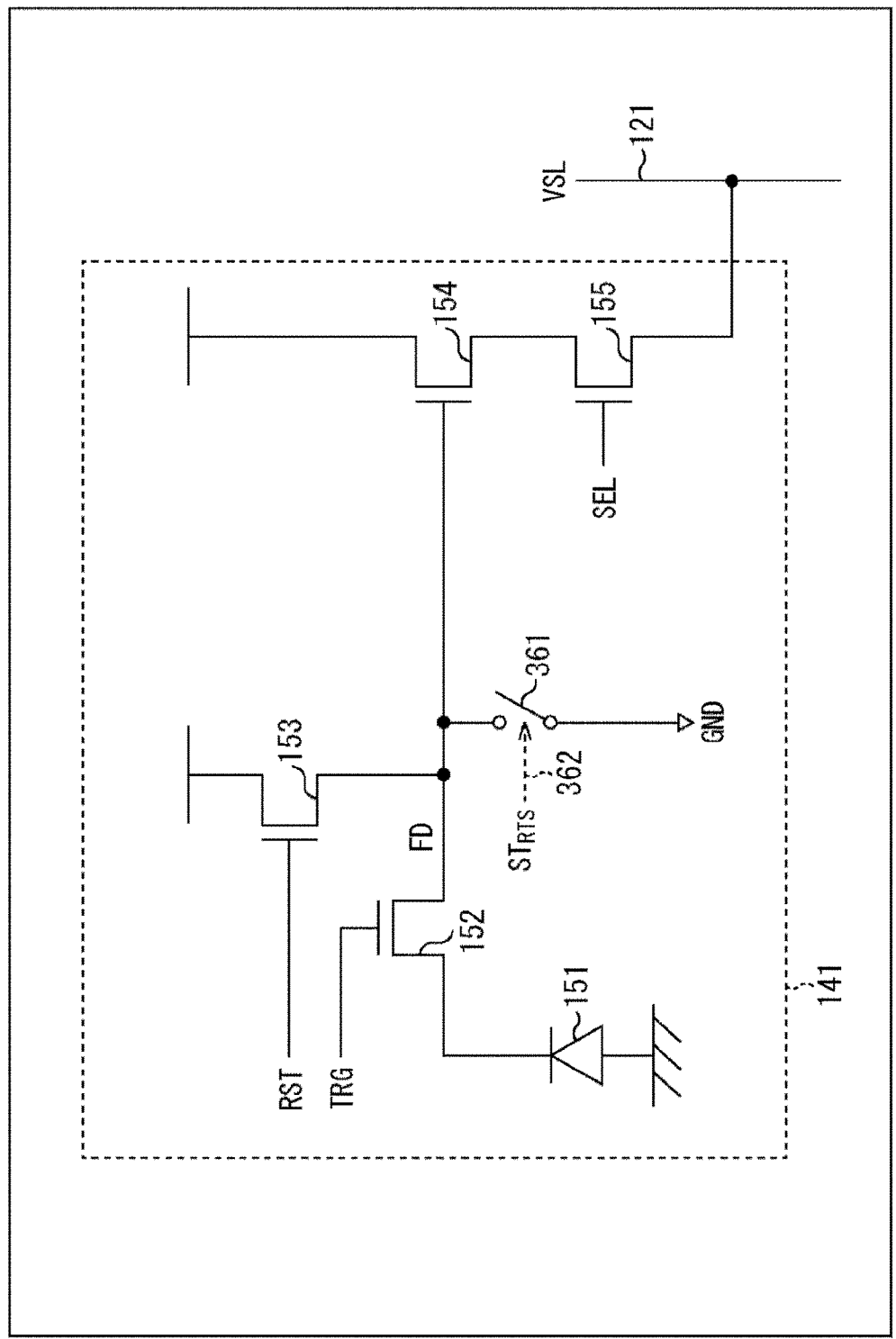
FIG. 15 is a diagram illustrating a main configuration example of the comparison unit.

In the case of the example illustrated in FIG. 15, the unit pixel 141 includes a switch 361 in addition to the configuration in the example in FIG. 4. The switch 361 is provided between a floating diffusion (FD) and a ground potential (GND), is driven in accordance with a control signal $ST_{RTS}$ supplied from a control unit 111 through a control line 362 (in other words, in accordance with the control of the control unit 111), and is capable of short-circuiting the floating diffusion (FD) to the ground potential. That is to say, the switch 361 is capable of short-circuiting a gate of an amplifying transistor 154 to a potential which reduces a gate-to-source voltage of the amplifying transistor 154.

A control process of that case is basically similar to that of the case described with reference to the flowchart in FIG. 8. In other words, the control unit 111 short-circuits the floating diffusion (FD) to the ground potential in a non-operating period of the amplifying transistor 154. By doing so, the unit pixel 141 can suppress RTS noise occurring in the amplifying transistor 154. Therefore, an image sensor 100 can suppress the RTS noise included in a pixel signal read from the pixel array 101, and can suppress reduction in image quality of a picked-up image obtained in the image sensor 100.

3. Third Embodiment

<Physical Configuration of Image Sensor>

It should be noted that an image pickup element to which the present technology is applied can be realized, for example, as a package (chip) in which a semiconductor substrate is sealed or a module in which the package (chip) is placed on a circuit substrate. For example, in a case where it is realized as a package (chip), the image pickup element may be configured by a single semiconductor substrate in the package (chip), or may be configured by multiple semiconductor substrates overlapping each other.

Figure 16:
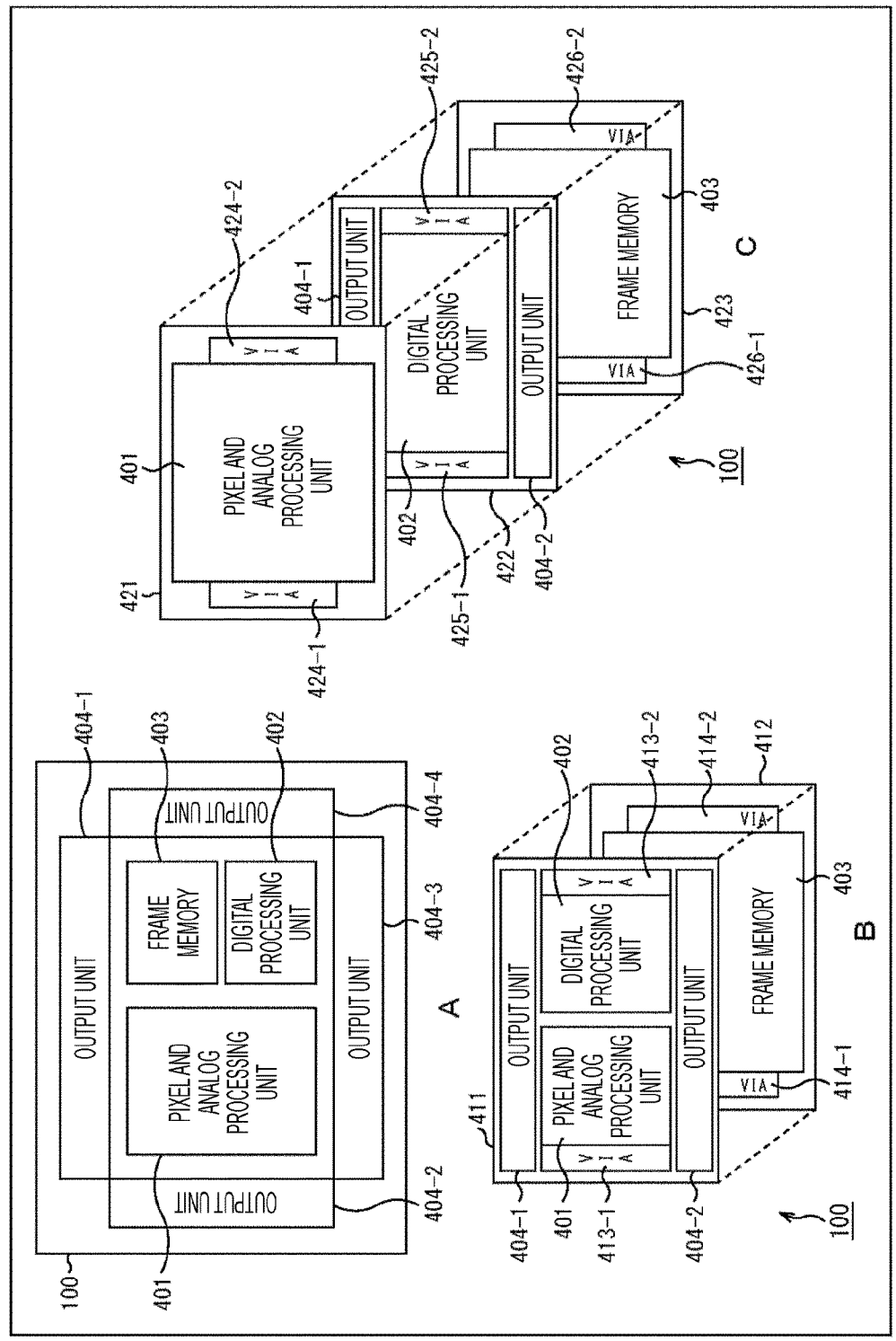
FIG. 16 is a diagram illustrating a physical configuration example of the image sensor.

FIG. 16 is a diagram illustrating an example of a physical configuration of an image sensor 100, which is an image pickup element to which the present technology is applied.

In the case of an example illustrated in A of FIG. 16, all circuit configurations of the image sensor 100 described with reference to FIG. 2 and the like are formed on a single semiconductor substrate. In the case of the example in A of FIG. 16, output units 404-1 to 404-4 are disposed to surround a pixel and analog processing unit 401, a digital processing unit 402, and a frame memory 403. The pixel and analog processing unit 401 is a region where an analog configuration of a pixel array 101, an A/D converter 103, or the like is formed. The output units 404-1 to 404-4 are regions where a configuration of, for example, an I/O cell is disposed.

As a matter of course, the configuration example in A of FIG. 16 is an example, and the disposition in the configuration of each processing unit is not limited to the example.

In the case of an example illustrated in B of FIG. 16, circuit configurations of the image sensor 100 described with reference to FIG. 2 and the like are formed on two semiconductor substrates (laminated substrates (a pixel substrate 411 and a circuit substrate 412)) overlapping each other.

The pixel and analog processing unit 401, the digital processing unit 402, and the output units 404-1 and 404-2 are formed on the pixel substrate 411. The output units 404-1 and 404-2 are regions where a configuration of, for example, an I/O cell is disposed.

Also, the frame memory 403 is formed on the circuit substrate 412.

As described above, the pixel substrate 411 and the circuit substrate 412 overlap each other and form a multi-layered structure (laminated structure). The pixel and analog processing unit 401 formed on the pixel substrate 411 and the frame memory 403 formed on the circuit substrate 412 are electrically connected to each other, for example, through a through via (VIA) formed in via regions (VIA) 413-1 and 414-1. Similarly, the digital processing unit 402 formed on the pixel substrate 411 and the frame memory 403 formed on the circuit substrate 412 are electrically connected to each other, for example, through a through via (VIA) formed in via regions (VIA) 413-2 and 414-2.

The present technology can be applied also to an image sensor having such a laminated structure. It should be noted that the number (number of layers) of the semiconductor substrates (laminated chips) is arbitrary, and may be three or more, for example, as illustrated in C of FIG. 16.

In the case of an example in C of FIG. 16, the image sensor 100 includes semiconductor substrates 421, 422, and 423. The semiconductor substrates 421 to 423 overlap each other and form a multi-layered structure (laminated structure). The pixel and analog processing unit 401 is formed on the semiconductor substrate 421, the digital processing unit 402, and the output units 404-1 and 404-2 are formed on the semiconductor substrate 422, and the frame memory 403 is formed on the semiconductor substrate 423. Each of the processing units of each of the semiconductor substrates is electrically connected to each other through a through via (VIA) formed in via regions (VIA) 424-1, 425-1, and 426-1, and through a through via (VIA) formed in via regions (VIA) 424-2, 425-2, and 426-2.

The present technology can be applied also to an image sensor having such a laminated structure. As a matter of course, the processing unit formed on each semiconductor substrate is arbitrary, and is not limited to the example in FIG. 16.

<Area A/D Converter>

For example, it has been described in the above that the A/D converter (column A/D converter 161) is provided in each unit pixel column in the A/D converter 103, and each column A/D converter 161 performs A/D conversion of a signal read from each unit pixel in the unit pixel column. However, the configuration example of the A/D converter 103 is not limited thereto. For example, a configuration may be employed in which in the pixel array 101, a pixel unit is formed for each predetermined number of unit pixels, an A/D converter (area A/D converter) is provided for each of the pixel units in the A/D converter 103, and each area A/D converter performs A/D conversion of a signal read from each unit pixel which belongs to the pixel unit assigned thereto.

Figure 17:
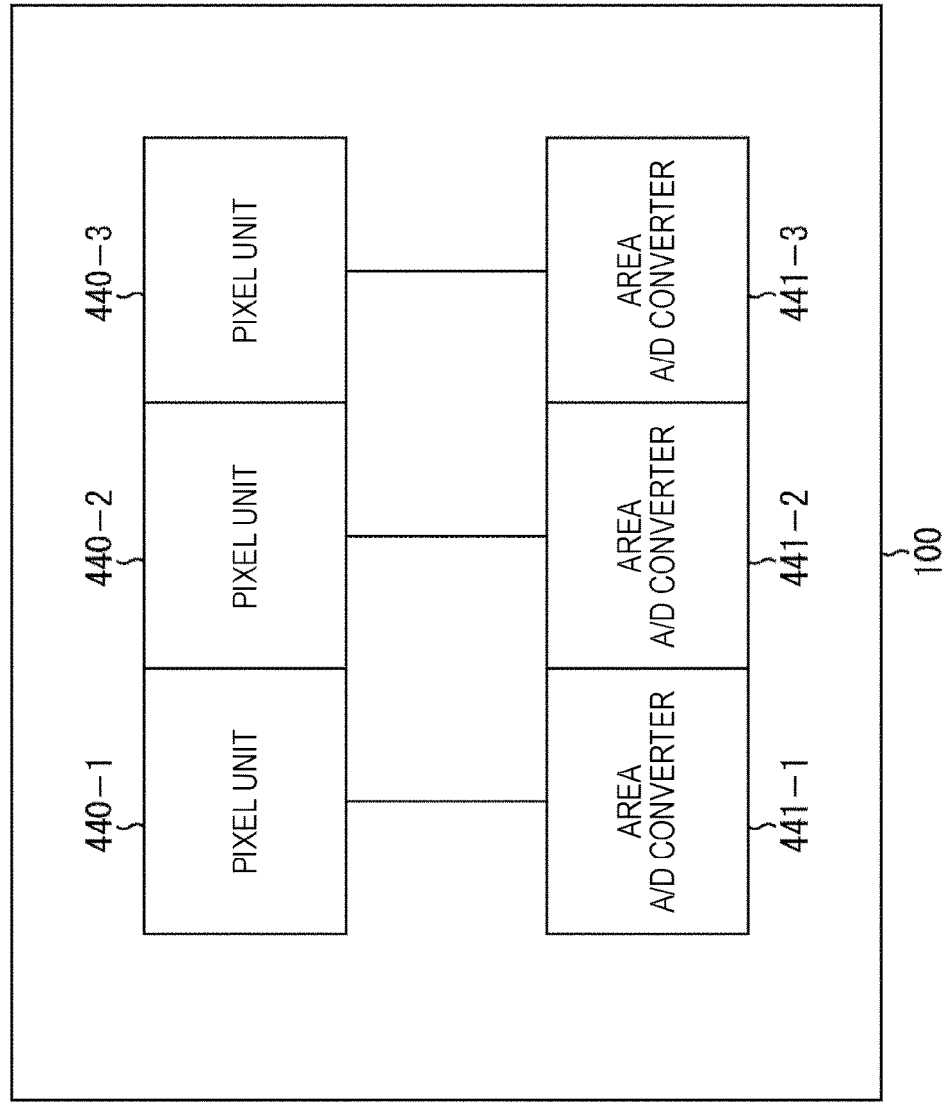
FIG. 17 is a diagram illustrating another configuration example of the image sensor.

In that case, for example, as an example illustrated in FIG. 17, the pixel unit and the area A/D converter may be formed on the same semiconductor substrate. In the case of the example in FIG. 17, the pixel units 440-1 to 440-3 and the area A/D converters 441-1 to 441-3 respectively corresponding thereto are formed on the same semiconductor substrate. As a matter of course, the numbers of the pixel units and the area A/D converters are arbitrary.

Hereinafter, the pixel units formed in the pixel array 101 are referred to as a pixel unit 440 when there is no need to discriminate each pixel unit from one another for explanation thereof, and the area A/D converters formed in the A/D converter 103 are referred to as an area A/D converter 441 when there is no need to discriminate each area A/D converter from one another for explanation thereof.

Also in this case, the configuration of the image sensor 100 may be formed on a plurality of semiconductor substrates. For example, as illustrated in FIG. 18, the image sensor 100 may include two semiconductor substrates (laminated chips (a pixel substrate 451 and a circuit substrate 452)) overlapping each other.

Figure 18:
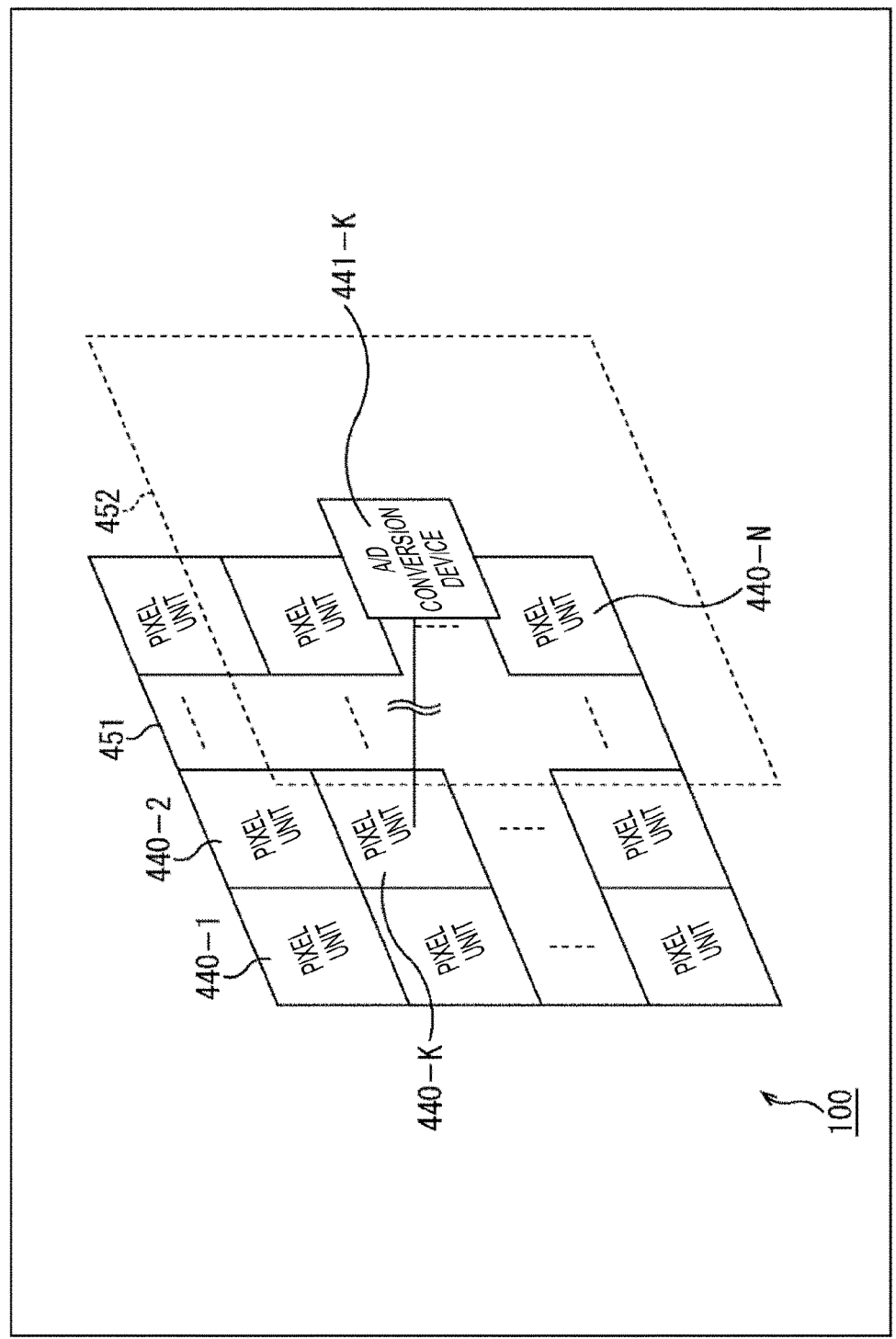
FIG. 18 is a diagram illustrating another configuration example of the image sensor.

In the case of an example in FIG. 18, N pixel units 440 (pixel units 440-1 to 440-N) of the pixel region (in other words, the pixel array 101) are formed on the pixel substrate 451. Also, on a position in the circuit substrate 452 which overlaps each pixel unit 440, an area A/D converter 441 corresponding to the pixel unit 440 is formed. For example, on a position in the circuit substrate 452 which is the same position as that of a pixel unit 440-K in the pixel substrate 451 (position which overlaps the pixel unit 440-K), an area A/D converter 441-K which performs A/D conversion of a signal read from the unit pixel of the pixel unit 440-K is formed.

As a matter of course, the number (number of layers) of the semiconductor substrates in the image sensor 100 is arbitrary also in this case, and may be three or more.

4. Fourth Embodiment

<Image Pickup Apparatus>

Figure 19:
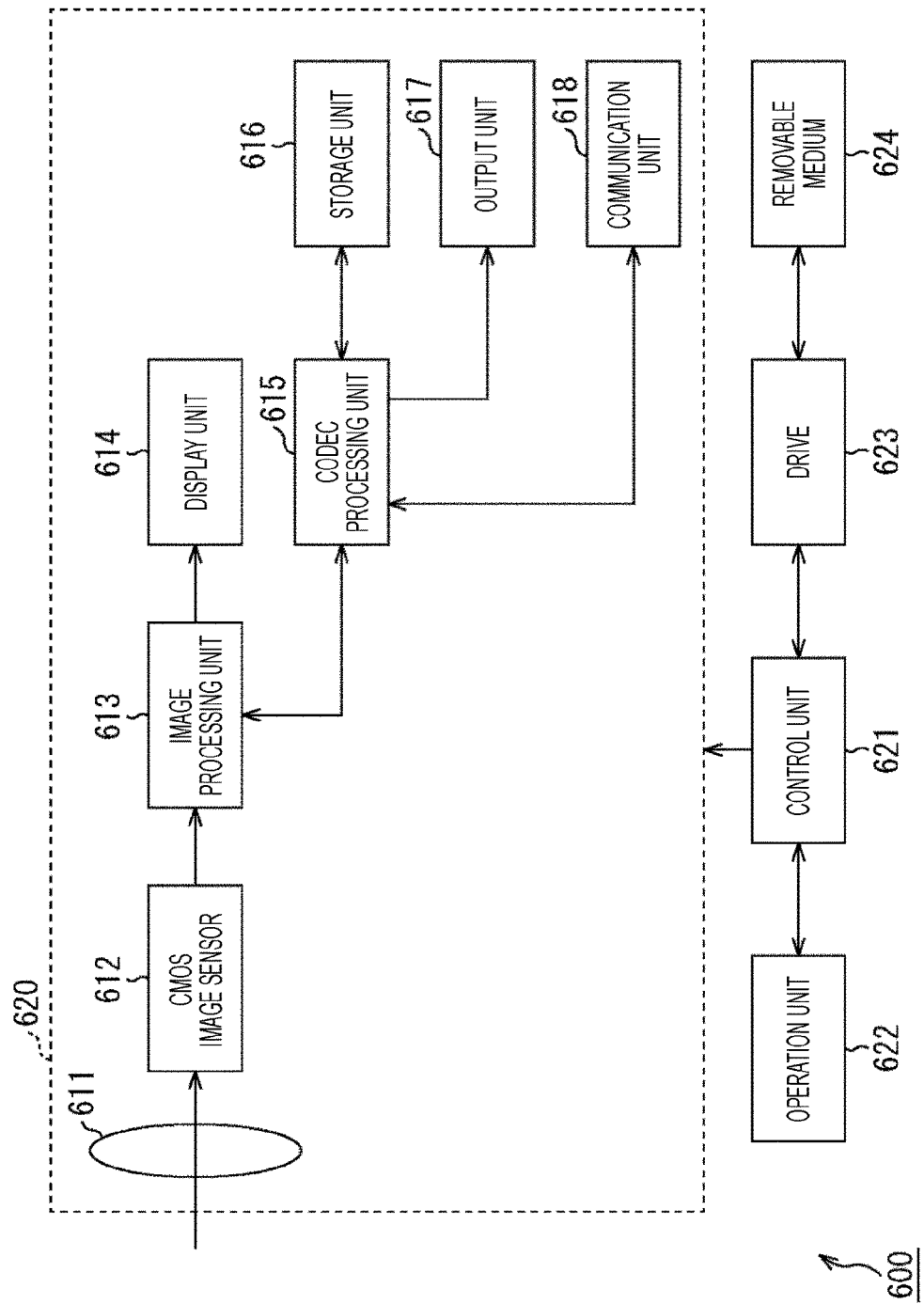
FIG. 19 is a diagram illustrating a main configuration example of an image pickup apparatus.

It should be noted that an image pickup element is not the only item to which the present technology can be applied. The present technology may be applied to an apparatus (such as an electronic device) including an image pickup element, for example, an image pickup apparatus. FIG. 19 is a block diagram illustrating a main configuration example of an image pickup apparatus as an example of an electronic device to which the present technology is applied. The image pickup apparatus 600 illustrated in FIG. 19 is an apparatus which picks up an image of an object, and outputs the image of the object as an electric signal.

As illustrated in FIG. 19, the image pickup apparatus 600 includes an optical unit 611, a CMOS image sensor 612, an image processing unit 613, a display unit 614, a codec processing unit 615, a storage unit 616, an output unit 617, a communication unit 618, a control unit 621, an operation unit 622, and a drive 623.

The optical unit 611 includes a lens, a diaphragm, and a shutter. The lens adjusts a focus to an object, and collects light from a position where the object comes into focus. The diaphragm adjusts exposure. The shutter controls timing for image pickup. The optical unit 611 transmits light from the object (incident light) and supplies the light to the CMOS image sensor 612.

The CMOS image sensor 612 photoelectrically converts the incident light to perform A/D conversion of a signal for each pixel (pixel signal), performs a signal process such as CDS, and supplies processed picked-up image data to the image processing unit 613.

The image processing unit 613 performs an image process of the picked-up image data obtained by the CMOS image sensor 612. More specifically, the image processing unit 613 performs various image processes such as color mixture correction, black level correction, white balance adjustment, a demosaicing process, a matrixing process, gamma correction, and YC conversion, with respect to the picked-up image data supplied from the CMOS image sensor 612. The image processing unit 613 supplies the image-processed picked-up image data to the display unit 614.

The display unit 614 is configured, for example, as a liquid crystal display, and displays an image of the picked-up image data (for example, an image of the object) supplied from the image processing unit 613.

The image processing unit 613 further supplies the image-processed picked-up image data to the codec processing unit 615, if necessary.

The codec processing unit 615 performs an encoding process of a predetermined system with respect to the picked-up image data supplied from the image processing unit 613, and supplies the obtained encoded data to the storage unit 616. Also, the codec processing unit 615 reads and decodes the encoded data recorded in the storage unit 616 to generate decoded image data, and supplies the decoded image data to the image processing unit 613.

The image processing unit 613 performs a predetermined image process with respect to the decoded image data supplied from the codec processing unit 615. The image processing unit 613 supplies the image-processed decoded image data to the display unit 614. The display unit 614 is configured, for example, as a liquid crystal display, and displays an image of the decoded image data supplied from the image processing unit 613.

Also, the codec processing unit 615 may supply, to the output unit 617, encoded data obtained by encoding the picked-up image data supplied from the image processing unit 613, or encoded data of the picked-up image data read from the storage unit 616, so as to output the encoded data outside the image pickup apparatus 600. Also, the codec processing unit 615 may supply, to the output unit 617, picked-up image data before encoding, or decoded image data obtained by decoding encoded data read from the storage unit 616, so as to output the picked-up image data or the decoded image data outside the image pickup apparatus 600.

Furthermore, the codec processing unit 615 may transmit picked-up image data, encoded data of the picked-up image data, or decoded image data to other apparatus through the communication unit 618. Also, the codec processing unit 615 may acquire picked-up image data or encoded data of image data through the communication unit 618. The codec processing unit 615 appropriately performs encoding, decoding, or the like, with respect to the picked-up image data or the encoded data of image data acquired through the communication unit 618. The codec processing unit 615 may supply to the image processing unit 613, or output to the storage unit 616, the output unit 617, and the communication unit 618, the obtained image data or encoded data, as described above.

The storage unit 616 stores encoded data and the like supplied from the codec processing unit 615. The encoded data stored in the storage unit 616 is read and decoded by the codec processing unit 615, if necessary. The picked-up image data obtained by the decoding process is supplied to the display unit 614, and a picked-up image corresponding to the picked-up image data is displayed.

The output unit 617 includes an external output interface such as an external output terminal, and outputs various kinds of data supplied through the codec processing unit 615 outside the image pickup apparatus 600 through the external output interface.

The communication unit 618 supplies various kinds of information such as image data or encoded data supplied from the codec processing unit 615 to other apparatuses which are partner apparatuses of predetermined communication (wired or wireless communication). Also, the communication unit 618 acquires various kinds of information such as image data or encoded data from other apparatuses which are partner apparatuses of predetermined communication (wired or wireless communication), and supplies the acquired information to the codec processing unit 615.

The control unit 621 controls an operation of each processing unit (each processing unit illustrated inside a dotted line 620, the operation unit 622, and the drive 623) of the image pickup apparatus 600.

The operation unit 622 includes, for example, an arbitrary input device such as Jog Dial (trademark), a key, a button, or a touch panel, receives operation input, for example, by a user, and supplies a signal corresponding to the operation input to the control unit 621.

The drive 623 reads information stored in a removable medium 624, such as a magnetic disk, an optical disc, a magneto-optical disc, or a semiconductor memory, inserted therein. The drive 623 reads various kinds of information such as a program or data from the removable medium 624, and supplies the read information to the control unit 621. Also, when a writable removable medium 624 is inserted in the drive 623, the drive 623 can store, in the removable medium 624, various kinds of information such as image data or encoded data supplied through the control unit 621.

As the CMOS image sensor 612 of the above image pickup apparatus 600, the present technology described above in each embodiment is applied. In other words, the above-described image sensor 100 is used as the CMOS image sensor 612. Consequently, the CMOS image sensor 612 can suppress RTS noise and suppress reduction in image quality of a picked-up image. Therefore, the image pickup apparatus 600 can obtain a picked-up image with higher image quality by picking up an image of an object.

A series of the above-described processes can be executed by hardware, or by software. When the series of the above-described processes is executed by software, a program which constitutes the software is installed from a network or a recording medium.

The recording medium is constituted, for example, by the removable medium 624 in which a program is recorded and which is distributed separately from a main body of an apparatus in order to deliver the program to a user, as illustrated in FIG. 19. The removable medium 624 includes a magnetic disk (including a flexible disk), and an optical disc (including a CD-ROM and a DVD). Furthermore, a magneto-optical disc (including a mini disc (MD)), and a semiconductor memory are included.

In that case, it is possible to install the program in the storage unit 616 by inserting the removable medium 624 in the drive 623.

Also, it is possible to provide the program through a wired or wireless transmission medium such as a local area network, the internet, and digital satellite broadcasting. In that case, it is possible to receive the program by the communication unit 618 and install the program in the storage unit 616.

Besides, it is also possible to install the program in advance in the storage unit 616 or a read only memory (ROM) or the like in the control unit 621.

It should be noted that the program executed by a computer may be a program in which processes are performed chronologically in accordance with the order described herein, or a program in which processes are performed in parallel, or at necessary timing, for example, when calling is performed.

Also, a step of describing a program recorded in the recording medium herein includes, as a matter of course, processes performed chronologically in accordance with the described order, and in addition, processes which are executed in parallel or individually, even when the processes are not necessarily performed chronologically.

Also, it is possible to execute the process of each step described above in each apparatus described above, or an arbitrary apparatus other than each apparatus described above. In that case, it is sufficient that the apparatus which executes the process have the function (such as a functional block) necessary to execute the process described above. Also, it is sufficient that information necessary to the process be appropriately transmitted to the apparatus.

Also, a system herein means a collection of a plurality of components (such as an apparatus, a module (part)), irrespective of whether all components are in the same housing. Therefore, both of multiple apparatuses accommodated in separate housings and connected through a network, and one apparatus in which a plurality of modules is accommodated in one housing are systems.

Also, the configuration described in the above as one apparatus (or processing unit) may be divided and configured as a plurality of apparatuses (or processing units). Conversely, the configuration described in the above as a plurality of apparatuses (or processing units) may be integrated and configured as one apparatus (or processing unit). Also, as a matter of course, a configuration other than those described above may be added to the configuration of each apparatus (or each processing unit). Furthermore, as long as a configuration or an operation of the system as a whole is substantially the same, a part of a configuration of an apparatus (or processing unit) may be included in a configuration of other apparatus (or other processing unit).

The preferred embodiments of the present disclosure have been described in detail with reference to the accompanying drawings. However, the technical scope of the present disclosure is not limited to the above examples. A person having ordinary knowledge in a technical field of the present disclosure may obviously find various alterations and modifications within the scope of the technical ideas described in the appended claims, and it should be understood that they will naturally come under the technical scope of the present disclosure.

For example, the present technology may have a cloud computing configuration in which a plurality of apparatuses shares one function through a network, and jointly performs a process.

Also, each step described with the above flowchart can be executed by one apparatus, and in addition, can be shared and executed by a plurality of apparatuses.

Furthermore, when a plurality of processes is included in one step, the plurality of processes included in the one step can be executed by one apparatus, and in addition, can be shared and executed by a plurality of apparatuses.

Also, the present technology is not limited to the above, and can also be implemented as any configurations mounted on such apparatuses, or apparatuses constituting such systems, for example, a processor as a system large scale integration (LSI) or the like, a module using a plurality of processors or the like, a unit using a plurality of modules or the like, a set obtained by further adding other functions to the unit or the like (in other words, a configuration of a part of the apparatus).

It should be noted that the present technology may have the following configurations.

(1) A signal processing apparatus including:
an amplifying transistor that amplifies a signal input to a gate; and
a short-circuit unit capable of short-circuiting the gate of the amplifying transistor to a potential that reduces a gate-to-source voltage of the amplifying transistor.

(2) The signal processing apparatus according to (1),
wherein the amplifying transistor is a negative metal oxide semiconductor (NMOS).

(3) The signal processing apparatus according to (2),
wherein the short-circuit unit is capable of short-circuiting the gate of the amplifying transistor to a ground potential.

(4) The signal processing apparatus according to any one of (1) to (3),
wherein the amplifying transistor is a positive metal oxide semiconductor (PMOS).

(5) The signal processing apparatus according to (4),
wherein the short-circuit unit is capable of short-circuiting the gate of the amplifying transistor to a power supply potential.

(6) The signal processing apparatus according to any one of (1) to (5),
wherein the amplifying transistor is an input transistor of a comparison unit that compares signal levels of two signals input thereto and outputs a comparison result.

(7) The signal processing apparatus according to (6),
further including an auto-zero unit capable of performing auto-zeroing by short-circuiting the gate and a drain of the amplifying transistor to short-circuit an input side and an output side of the comparison unit,
wherein the short-circuit unit short-circuits the drain of the amplifying transistor, in which the gate and the drain have been short-circuited by the auto-zero unit, to the potential that reduces the gate-to-source voltage of the amplifying transistor.

(8) The signal processing apparatus according to (6) or (7),
further including a cutting unit that cuts off the short-circuit unit from the output side of the comparison unit when the gate of the amplifying transistor is short-circuited by the short-circuit unit to the potential that reduces the gate-to-source voltage of the amplifying transistor.

(9) The signal processing apparatus according to any one of (6) to (8),
further including a counter that performs counting until the comparison result output from the comparison unit is changed,
wherein the comparison unit compares signal levels of an input analog signal and a predetermined reference signal, and outputs a comparison result thereof to the counter, and
the counter performs counting until the comparison result is changed, and outputs a count value thereof as digital data obtained by A/D converting the input analog signal.

(10) The signal processing apparatus according to (9),
wherein the comparison unit compares signal levels of a signal read from a unit pixel formed in a pixel region, and the reference signal, and
the counter outputs a count value obtained until the comparison result output from the comparison unit is changed as digital data obtained by A/D converting the signal.

(11) The signal processing apparatus according to (10),
wherein the comparison unit compares signal levels of a signal read from a unit pixel in a row corresponding thereto in a pixel region in which the unit pixels are arranged in a matrix, and the reference signal.

(12) The signal processing apparatus according to (10) or (11),
wherein the short-circuit unit short-circuits the gate of the amplifying transistor to the potential that reduces the gate-to-source voltage of the amplifying transistor in a period of a non-operating state of the comparison unit.

(13) The signal processing apparatus according to (12),
wherein the period is a horizontal blanking period in a reading process of the signal.

(14) The signal processing apparatus according to (12) or (13),
wherein the period is a vertical blanking period in a reading process of the signal.

(15) The signal processing apparatus according to any one of (1) to (14),
wherein the amplifying transistor is an amplifying transistor that is formed in each unit pixel in a pixel region, amplifies and outputs potential changes in a floating diffusion as an analog signal, and
the short-circuit unit short-circuits the floating diffusion to the potential that reduces the gate-to-source voltage of the amplifying transistor.

(16) The signal processing apparatus according to any one of (1) to (15),
further including a control unit that controls the short-circuit unit,
wherein the control unit causes the short-circuit unit to short-circuit the gate of the amplifying transistor to the potential that reduces the gate-to-source voltage of the amplifying transistor in a period of a non-operating state of the amplifying transistor.

(17) The signal processing apparatus according to (16),
wherein the control unit determines whether the amplifying transistor is in a period of a non-operating state, and when the amplifying transistor is determined to be in the period of a non-operating state, the control unit causes the short-circuit unit to short-circuit the gate of the amplifying transistor to the potential that reduces the gate-to-source voltage of the amplifying transistor, and
the control unit determines whether the period of a non-operating state ends, and when it is determined that the period of a non-operating state ends, the control unit causes the short-circuit unit to cut off the gate of the amplifying transistor from the potential that reduces the gate-to-source voltage of the amplifying transistor.

(18) A control method including:
determining whether an amplifying transistor that amplifies a signal input to a gate is in a period of a non-operating state; when the amplifying transistor is determined to be in the period of a non-operating state, short-circuiting the gate of the amplifying transistor to a potential that reduces a gate-to-source voltage of the amplifying transistor; and
determining whether the period of a non-operating state ends; when it is determined that the period of a non-operating state ends, cutting off the gate of the amplifying transistor from the potential which reduces the gate-to-source voltage of the amplifying transistor.

(19) An image pickup element including:
a pixel array in which a plurality of unit pixels is arranged in a matrix;
a comparison unit that compares signal levels of a signal read from the unit pixel in the pixel array and a predetermined reference signal; and
a counter that performs counting until a comparison result of the signal levels of the signal and the reference signal that is obtained by the comparison unit is changed, and outputs a count value thereof as digital data obtained by A/D converting the signal,
wherein the comparison unit includes:
an amplifying transistor that inputs a signal read from the unit pixel to a gate thereof and that amplifies the signal; and
a short-circuit unit capable of short-circuiting the gate of the amplifying transistor to a potential that reduces a gate-to-source voltage of the amplifying transistor.

(20) An electronic device including:
an image pickup unit that picks up an image of an object, and
an image processing unit that image-processes image data obtained by image pickup by the image pickup unit,
wherein the image pickup unit includes:
a pixel array in which a plurality of unit pixels is arranged in a matrix;
a comparison unit that compares signal levels of a signal read from the unit pixel in the pixel array and a predetermined reference signal; and
a counter that performs counting until a comparison result of the signal levels of the signal and the reference signal that is obtained by the comparison unit is changed, and outputs a count value thereof as digital data obtained by A/D converting the signal, and
wherein the comparison unit includes:
an amplifying transistor that inputs a signal read from the unit pixel to a gate thereof and that amplifies the signal, and
a short-circuit unit capable of short-circuiting the gate of the amplifying transistor to a potential which reduces a gate-to-source voltage of the amplifying transistor.

REFERENCE SIGNS LIST

100 Image sensor
101 Pixel array
102 Reference voltage generation unit
103 A/D converter
104 Horizontal transfer unit
111 Control unit
112 Vertical scanning unit
121 Vertical signal line
122 Reference signal line
123 and 124 Signal line
125 Control line
131 to 134 Control line
141 Unit pixel
151 Photodiode
152 Transfer transistor
153 Reset transistor
154 Amplifying transistor
155 Selection transistor
161 Column A/D converter
171 Comparison unit
172 Counter
173 and 174 Capacitor
181 Comparison unit
201 to 205 Transistor
206 and 207 Switch
211 and 212 Transistor
213 Capacitor
221 to 224 Switch
251 to 255 Transistor
256 and 257 Switch
271 to 274 Switch
281 and 282 Transistor
283 Capacitor
301 and 302 Switch
341 to 344 Switch
361 Switch
362 Control line
600 Image pickup apparatus
612 CMOS image sensor

The invention claimed is:

1. A signal processing apparatus comprising:
an amplifying transistor that amplifies a signal input to a gate, wherein the amplifying transistor is an input transistor of a comparison unit that compares signal levels of two signals input thereto and outputs a comparison result;
an auto-zero unit capable of performing auto-zeroing by short-circuiting the gate and a drain of the amplifying transistor to short-circuit an input side and an output side of the comparison unit and
a short-circuit unit capable of short-circuiting the gate of the amplifying transistor, wherein the short-circuit unit short-circuits the drain of the amplifying transistor, in which the gate and the drain have been short-circuited by the auto-zero unit, to a potential that reduces a gate-to-source voltage of the amplifying transistor.

2. The signal processing apparatus according to claim 1, wherein the amplifying transistor is a negative metal oxide semiconductor (NMOS).

3. The signal processing apparatus according to claim 2, wherein the short-circuit unit is capable of short-circuiting the gate of the amplifying transistor to a ground potential.

4. The signal processing apparatus according to claim 1, wherein the amplifying transistor is a positive metal oxide semiconductor (PMOS).

5. The signal processing apparatus according to claim 4, wherein the short-circuit unit is capable of short-circuiting the gate of the amplifying transistor to a power supply potential.

6. The signal processing apparatus according to claim 1, further comprising a cutting unit that cuts off the short-circuit unit from the output side of the comparison unit when the gate of the amplifying transistor is short-circuited by the short-circuit unit to the potential that reduces the gate-to-source voltage of the amplifying transistor.

7. The signal processing apparatus according to claim 1,
further comprising a counter that performs counting until the comparison result output from the comparison unit is changed,
wherein the comparison unit compares signal levels of an input analog signal and a predetermined reference signal, and outputs the comparison result thereof to the counter, and
the counter performs counting until the comparison result is changed, and outputs a count value thereof as digital data obtained by A/D converting the input analog signal.

8. The signal processing apparatus according to claim 7,
wherein the comparison unit compares signal levels of a signal read from a unit pixel formed in a pixel region, and the predetermined reference signal, and
the counter outputs the count value obtained until the comparison result output from the comparison unit is changed as digital data obtained by A/D converting the signal.

9. The signal processing apparatus according to claim 8,
wherein the comparison unit compares the signal levels of the signal read from the unit pixel in a row corresponding thereto in the pixel region in which a plurality of unit pixels are arranged in a matrix, and the predetermined reference signal.

10. The signal processing apparatus according to claim 8,
wherein the short-circuit unit short-circuits the gate of the amplifying transistor to the potential that reduces the gate-to-source voltage of the amplifying transistor in a period of a non-operating state of the comparison unit.

11. The signal processing apparatus according to claim 10,
wherein the period is a horizontal blanking period in a reading process of the signal.

12. The signal processing apparatus according to claim 10,
wherein the period is a vertical blanking period in a reading process of the signal.

13. The signal processing apparatus according to claim 1,
wherein the amplifying transistor is an amplifying transistor that is formed in each unit pixel in a pixel region, amplifies and outputs potential changes in a floating diffusion as an analog signal, and
the short-circuit unit short-circuits the floating diffusion to the potential that reduces the gate-to-source voltage of the amplifying transistor.

14. The signal processing apparatus according to claim 1,
further comprising a control unit that controls the short-circuit unit,
wherein the control unit causes the short-circuit unit to short-circuit the gate of the amplifying transistor to the potential that reduces the gate-to-source voltage of the amplifying transistor in a period of a non-operating state of the amplifying transistor.

15. The signal processing apparatus according to claim 14,
wherein the control unit determines whether the amplifying transistor is in the period of the non-operating state, and when the amplifying transistor is determined to be in the period of the non-operating state, the control unit causes the short-circuit unit to short-circuit the gate of the amplifying transistor to the potential that reduces the gate-to-source voltage of the amplifying transistor, and
the control unit determines whether the period of the non-operating state ends, and when it is determined that the period of the non-operating state ends, the control unit causes the short-circuit unit to cut off the gate of the amplifying transistor from the potential that reduces the gate-to-source voltage of the amplifying transistor.

16. A control method comprising:
amplifying, by an amplifying transistor, a signal input to a gate, wherein the amplifying transistor is an input transistor of a comparison unit that compares signal levels of two signals input thereto and outputs a comparison result;
determining whether the amplifying transistor that amplifies the signal input to the gate is in a period of a non-operating state; when the amplifying transistor is determined to be in the period of the non-operating state, short-circuiting the gate of the amplifying transistor to a potential that reduces a gate-to-source voltage of the amplifying transistor;
determining whether the period of the non-operating state ends; when it is determined that the period of the non-operating state ends, cutting off the gate of the amplifying transistor from the potential which reduces the gate-to-source voltage of the amplifying transistor; and
performing auto-zeroing, by an auto-zero unit, by short-circuiting the gate and a drain of the amplifying transistor to short-circuit an input side and an output side of the comparison unit.

17. An image pickup element comprising:
a pixel array in which a plurality of unit pixels are arranged in a matrix;
a comparison unit that compares signal levels of a signal read from a unit pixel in the pixel array and a predetermined reference signal; and
a counter that performs counting until a comparison result of the signal levels of the signal and the predetermined reference signal that is obtained by the comparison unit is changed, and outputs a count value thereof as digital data obtained by A/D converting the signal,
wherein the comparison unit comprises:
an amplifying transistor that inputs the signal read from the unit pixel to a gate thereof and that amplifies the signal;
an auto-zero unit capable of performing auto-zeroing by short-circuiting the gate and a drain of the amplifying transistor to short-circuit an input side and an output side of the comparison unit; and
a short-circuit unit capable of short-circuiting the gate of the amplifying transistor, wherein the short-circuit unit short-circuits the drain of the amplifying transistor, in which the gate and the drain have been short-circuited by the auto-zero unit, to a potential that reduces a gate-to-source voltage of the amplifying transistor.

18. An electronic device comprising:
an image pickup unit that picks up an image of an object, and
an image processing unit that image-processes image data obtained by image pickup by the image pickup unit,
wherein the image pickup unit comprises:
a pixel array in which a plurality of unit pixels are arranged in a matrix;
a comparison unit that compares signal levels of a signal read from a unit pixel in the pixel array and a predetermined reference signal; and
a counter that performs counting until a comparison result of the signal levels of the signal and the predetermined reference signal that is obtained by the comparison unit is changed, and outputs a count value thereof as digital data obtained by A/D converting the signal, and wherein the comparison unit comprises:

an amplifying transistor that inputs the signal read from the unit pixel to a gate thereof and that amplifies the signal, an auto-zero unit capable of performing auto-zeroing by short-circuiting the gate and a drain of the amplifying transistor to short-circuit an input side and an output side of the comparison unit and a short-circuit unit capable of short-circuiting the gate of the amplifying transistor, wherein the short-circuit unit short-circuits the drain of the amplifying transistor, in which the gate and the drain have been short-circuited by the auto-zero unit, to a potential which reduces a gate-to-source voltage of the amplifying transistor.

* * * * *